United States Patent
Yoshisaka et al.

(10) Patent No.: US 10,473,169 B2
(45) Date of Patent: Nov. 12, 2019

(54) INTERRUPTER AND DIFFERENTIAL

(71) Applicant: JTEKT CORPORATION, Osaka-shi (JP)

(72) Inventors: Tadashi Yoshisaka, Kariya (JP); He Jin, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 44 days.

(21) Appl. No.: 15/668,047

(22) Filed: Aug. 3, 2017

(65) Prior Publication Data
US 2018/0038422 A1  Feb. 8, 2018

(30) Foreign Application Priority Data

Aug. 4, 2016 (JP) ................................. 2016-153786
Aug. 4, 2016 (JP) ................................. 2016-153787

(51) Int. Cl.
*F16D 27/118* (2006.01)
*F16D 11/14* (2006.01)
(Continued)

(52) U.S. Cl.
CPC ............ *F16D 27/118* (2013.01); *F16D 11/14* (2013.01); *F16D 27/108* (2013.01); *F16D 27/09* (2013.01); *F16D 27/10* (2013.01); *F16D 2011/008* (2013.01); *F16D 2027/008* (2013.01); *F16D 2300/06* (2013.01); *F16H 48/08* (2013.01); *F16H 48/10* (2013.01); *F16H 48/24* (2013.01);
(Continued)

(58) Field of Classification Search
CPC ...... F16D 27/118; F16D 27/108; F16D 11/14; F16D 2011/008; F16H 48/34; F16H 48/08; F16H 48/24; F16H 2048/082

USPC .......................................................... 475/231
See application file for complete search history.

(56) References Cited

U.S. PATENT DOCUMENTS

| | | | | |
|---|---|---|---|---|
| 5,052,534 A * | 10/1991 | Gustin | ..................... | F16D 23/04 192/53.2 |
| 6,761,662 B2 * | 7/2004 | Iwazaki | ................... | F16H 48/19 188/161 |
| 6,945,895 B2 * | 9/2005 | Fusegi | .................... | B60K 23/04 180/247 |
| 7,247,118 B2 * | 7/2007 | Haruki | ..................... | F16H 48/08 335/279 |
| 7,399,248 B2 * | 7/2008 | Kleinhans | ............... | F16H 48/08 475/149 |

(Continued)

FOREIGN PATENT DOCUMENTS

| JP | 2007-92990 | 4/2007 |
|---|---|---|
| JP | 2010-84930 | 4/2010 |

*Primary Examiner* — Jacob S. Scott
*Assistant Examiner* — James J Taylor, II
(74) *Attorney, Agent, or Firm* — Oblon, McClelland, Maier & Neustadt, L.L.P.

(57) ABSTRACT

An interrupter includes: an intermittent member having a meshing tooth meshing with a second rotary member, and moving in an axial direction between a coupled position and an uncoupled position; and an actuator making the intermittent member move in the axial direction. The actuator includes: a coil generating magnetic flux; and a plunger moving with the intermittent member in the axial direction. The plunger is disposed in a manner capable of making relative rotation to one of the first and second rotary members via first and second air gaps. When the coil is energized, the magnetic flux is introduced to the plunger from one of the first and second air gaps, the magnetic flux is led out of the plunger to the other air gap, and the plunger moves in the axial direction so as to reduce at least one air gap of the first and second air gaps.

18 Claims, 23 Drawing Sheets

(51) Int. Cl.
  *F16D 27/108* (2006.01)
  *F16D 27/09* (2006.01)
  *F16D 27/10* (2006.01)
  *F16H 48/10* (2012.01)
  *F16H 48/34* (2012.01)
  *F16H 48/08* (2006.01)
  *F16H 48/24* (2006.01)
  *F16D 27/00* (2006.01)
  *F16D 11/00* (2006.01)

(52) U.S. Cl.
  CPC ........ *F16H 48/34* (2013.01); *F16H 2048/082* (2013.01); *F16H 2048/087* (2013.01); *F16H 2048/106* (2013.01); *F16H 2048/346* (2013.01)

(56) References Cited

U.S. PATENT DOCUMENTS

| | | | | |
|---|---|---|---|---|
| 8,591,375 | B2 * | 11/2013 | Maruyama | F16D 27/118 |
| | | | | 192/84.92 |
| 9,033,843 | B2 * | 5/2015 | Knoblauch | F16D 11/14 |
| | | | | 475/231 |
| 2007/0054771 | A1 | 3/2007 | Fusegi | |
| 2007/0179008 | A1 * | 8/2007 | Fusegi | F16H 48/08 |
| | | | | 475/231 |
| 2008/0254931 | A1 * | 10/2008 | Sugaya | F16H 48/08 |
| | | | | 475/238 |
| 2010/0056314 | A1 * | 3/2010 | Maruyama | F16H 48/08 |
| | | | | 475/150 |

* cited by examiner

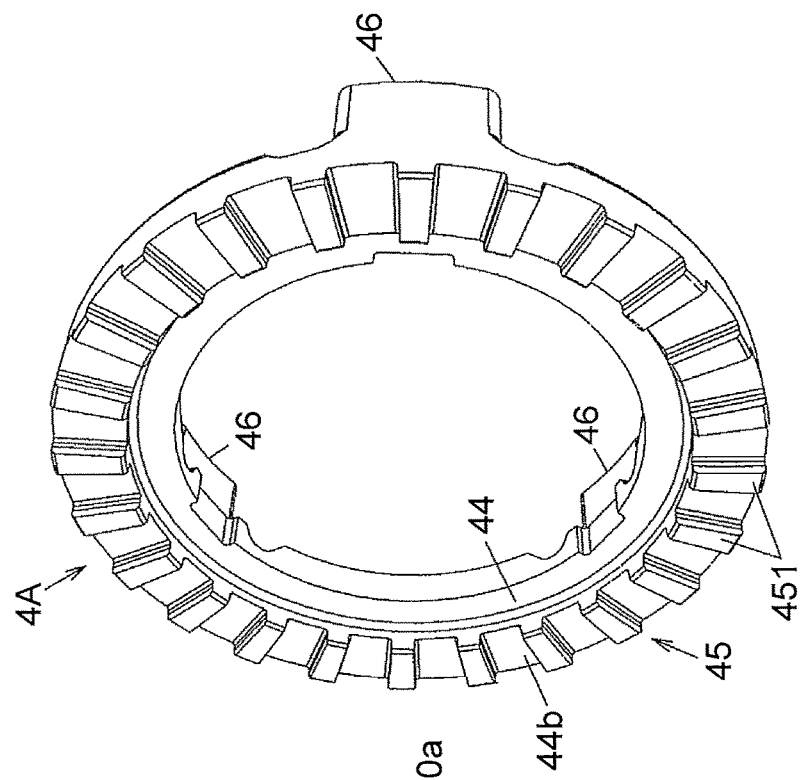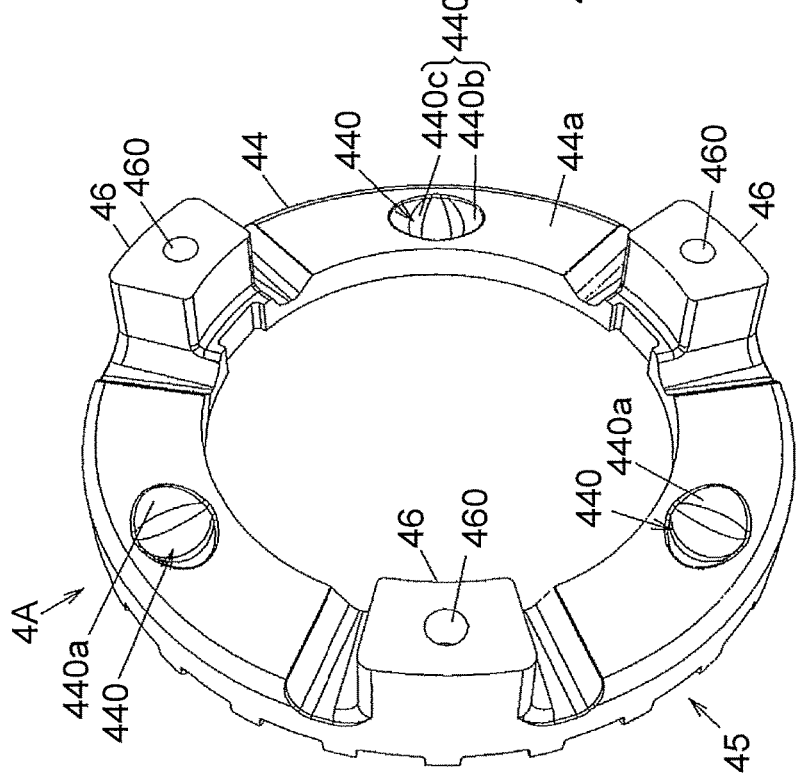

INTERRUPTER AND DIFFERENTIAL

INCORPORATION BY REFERENCE

The disclosure of Japanese Patent Application No. 2016-153786 filed on Aug. 4, 2016 and Japanese Patent Application No. 2016-153787 filed on Aug. 4, 2016, each including the specification, drawings and abstract, is incorporated herein by reference in its entirety.

BACKGROUND

1. Technical Field

The disclosure relates to an interrupter and a differential.

2. Description of Related Art

Some differential devices that permit differential motion of right and left wheels of a vehicle and distribute drive power thereto conventionally include an engaging clutch that restricts differential motion between rotary members capable of making relative rotation (for example, see Japanese Patent Application Publication No. 2007-92990 (JP 2007-92990 A) (paragraphs [0037], [0045], and [0047] of the specification) and Japanese Patent Application Publication No. 2010-84930 (JP 2010-84930 A)).

A differential device described in JP 2007-92990 A (see the paragraphs [0037], [0045], and [0047] of the specification) includes: a differential case; paired pinion gears that are pivotally supported on a pinion shaft fixed to the differential case; paired side gears that make a gear shaft orthogonal to the pinion gears and mesh therewith; an intermittent member (a clutch ring) that is engaged with a hole formed in the differential case in a rotational direction and is disposed to be movable in an axial direction; and an actuator that makes the intermittent member move in the axial direction.

The intermittent member has a meshing tooth that meshes with a ring fixed to one of the side gears, and rotates with the differential case. The actuator is configured by having a coil; a coil housing that includes a soft magnetic body covering a part of the coil; and a plunger that presses the intermittent member. The coil housing covers an outer peripheral side, one axial side, and a part of an inner peripheral side of the coil. The plunger is configured by integrally fixing a plunger body formed of a soft magnetic body to an outer periphery of a guide member that is formed of a non-magnetic body, such as stainless steel, disposed on an inner peripheral side. The coil housing is supported by a carrier via a support member and is disposed such that rotation thereof is stopped so as not to move relative to the differential case in the axial direction.

When the coil is energized, the plunger receives a movement operation force in the axial direction by magnetic flux that is generated in a magnetic line loop (magnetic path) permeating the coil housing, the plunger body, and an annular projection provided on a lateral wall of the differential case. When receiving this movement operation force, the intermittent member moves in the axial direction and meshes with the ring that is fixed to the one side gear. In this way, relative rotation of the differential case and the one side gear is restricted, and, in conjunction with this, differential rotation between the side gears is also restricted.

A differential device described in JP 2010-84930 A includes: a differential case, paired pinion gears that are pivotally supported on a pinion shaft fixed to the differential case; paired side gears that make a gear shaft orthogonal to the pinion gears and mesh therewith; an intermittent member that is engaged with a hole formed in the differential case in the rotational direction and is disposed to be movable in the axial direction; and an actuator that makes the intermittent member move in the axial direction.

The intermittent member has a meshing tooth that meshes one of the side gears, and rotates with the differential case. The actuator includes an electromagnet; and a movable member that moves in the axial direction by a magnetic force of the electromagnet. The electromagnet is configured by including an electromagnetic coil and a core that is disposed to surround the electromagnetic coil. The movable member is configured by including: a plunger formed of a soft magnetic material; and a ring that is formed of a non-magnetic material and prevents leakage of magnetic flux of the electromagnet to the differential case. The movable member is disposed inside the electromagnet. The electromagnet and the intermittent member are aligned in the axial direction.

When the electromagnet is energized, the plunger moves to the intermittent member side, and the ring presses the intermittent member via a plate that is fixed to the intermittent member. When receiving this pressing force, the intermittent member moves in the axial direction and meshes with the one side gear. In this way, relative rotation of the differential case and the one side gear is restricted, and, in conjunction with this, differential rotation between the side gears is also restricted.

SUMMARY

In the differential device described in JP 2007-92990 A (see the paragraphs [0037], [0045], and [0047] of the specification), because the magnetic line loop has a path that runs through the coil housing and the differential case in addition to the plunger body, an air gap (clearance) between the coil housing and the differential case is included in the path in addition to an air gap between the plunger body and each of the coil housing and the differential case. As a result, magnetoresistance of the magnetic line loop is increased. Thus, in order to compensate for a reduction in the movement operation force, which is applied to the plunger, due to the increased magnetoresistance, it is required, for example, to increase the number of winding of the coil or supply a large current to the coil.

In the differential device described in JP 2010-84930 A, the core, which is denoted by a reference numeral 79 in FIG. 1, has a substantially square cross-sectional shape formed to surround the electromagnetic coil, and a portion thereof that opposes a part of an inner peripheral surface of the electromagnetic coil is formed discontinuously. The plunger is disposed such that an axial end thereof opposes this discontinued portion, and constitutes a part of the magnetic flux that is generated by the energization to the electromagnetic coil.

The core in such a shape is difficult to be formed by a single member. Thus, as shown in FIG. 1 of JP 2010-84930 A, for example, the core has to be configured by welding three members, which are a member covering one lateral surface in the axial direction and a part of the inner peripheral surface of the electromagnetic coil, a member covering the other lateral surface in the axial direction of the electromagnetic coil, and a member covering an outer peripheral surface of the electromagnetic coil, by welding or the like. As a result, a structure and a manufacturing process of the core become complicated, which leads to increased manufacturing cost.

In view of the above, the disclosure provides an interrupter and a differential capable of interrupting coupling between rotary members by meshing of intermittent member that moves in an axial direction, the interrupter and the differential being able to reduce magnetoresistance in a magnetic path of magnetic flux that is generated by energization of a coil of an actuator that generates a moving force causing movement of the intermittent member.

The disclosure provides an interrupter that interrupts coupling of a first rotary member and a second rotary member disposed in a manner capable of making relative rotation to each other about a common rotational axis. The interrupter includes an intermittent member and an actuator. Relative rotation of the intermittent member to the first rotary member is restricted. The intermittent member has a meshing tooth meshing with the second rotary member, and is configured to move in an axial direction between a coupled position where the meshing tooth meshes with the second rotary member and an uncoupled position where the meshing tooth does not mesh with the second rotary member. The actuator is configured to make the intermittent member move in the axial direction. The actuator includes: a coil that generates magnetic flux when being energized; and a plunger formed of a soft magnetic body that moves with the intermittent member in the axial direction. The plunger is disposed in a manner capable of making relative movement to one rotary member of the first and second rotary members via first and second air gaps. When the coil is energized, the magnetic flux is introduced to the plunger from one air gap of the first and second air gaps, the magnetic flux is led out of the plunger to the other air gap, and the plunger moves in the axial direction so as to reduce at least one air gap of the first and second air gaps.

In addition, the disclosure provides a differential that includes: first and second rotary members disposed in a manner capable of making relative rotation to each other about a common rotational axis; an intermittent member; an actuator; and a differential mechanism. Relative rotation of the intermittent member to the first rotary member is restricted. The intermittent member has a meshing tooth meshing with the second rotary member, and is configured to move in an axial direction between a coupled position where the meshing tooth meshes with the second rotary member and an uncoupled position where the meshing tooth does not mesh with the second rotary member. The actuator is configured to make the intermittent member move in the axial direction. The differential mechanism is configured to receive drive power from paired output members while permitting differential motion thereof. The actuator has: a coil that generates magnetic flux when being energized; and a plunger that moves with the intermittent member in the axial direction. The plunger is disposed in a manner capable of making relative movement to one rotary member of the first and second rotary members via first and second air gaps. When the coil is energized, the magnetic flux is introduced to the plunger from one air gap of the first and second air gaps, the magnetic flux is led out of the plunger to the other air gap, and the plunger moves in the axial direction so as to reduce at least one air gap of the first and second air gaps.

According to the disclosure, the interrupter and the differential, which can intermittently transmit drive power between the rotary members by meshing of the intermittent member that moves in the axial direction, can reduce magnetoresistance in a magnetic path of the magnetic flux that is generated by the energization of the coil of the actuator generating a moving force causing the movement of the intermittent member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 22A is a perspective view in which an intermittent member of the differential according to the fifth embodiment is seen from one surface;

FIG. 22B is a perspective view in which the intermittent member of the differential according to the fifth embodiment is seen from the other surface.

DETAILED DESCRIPTION OF EMBODIMENTS

First Embodiment

Figure 1:
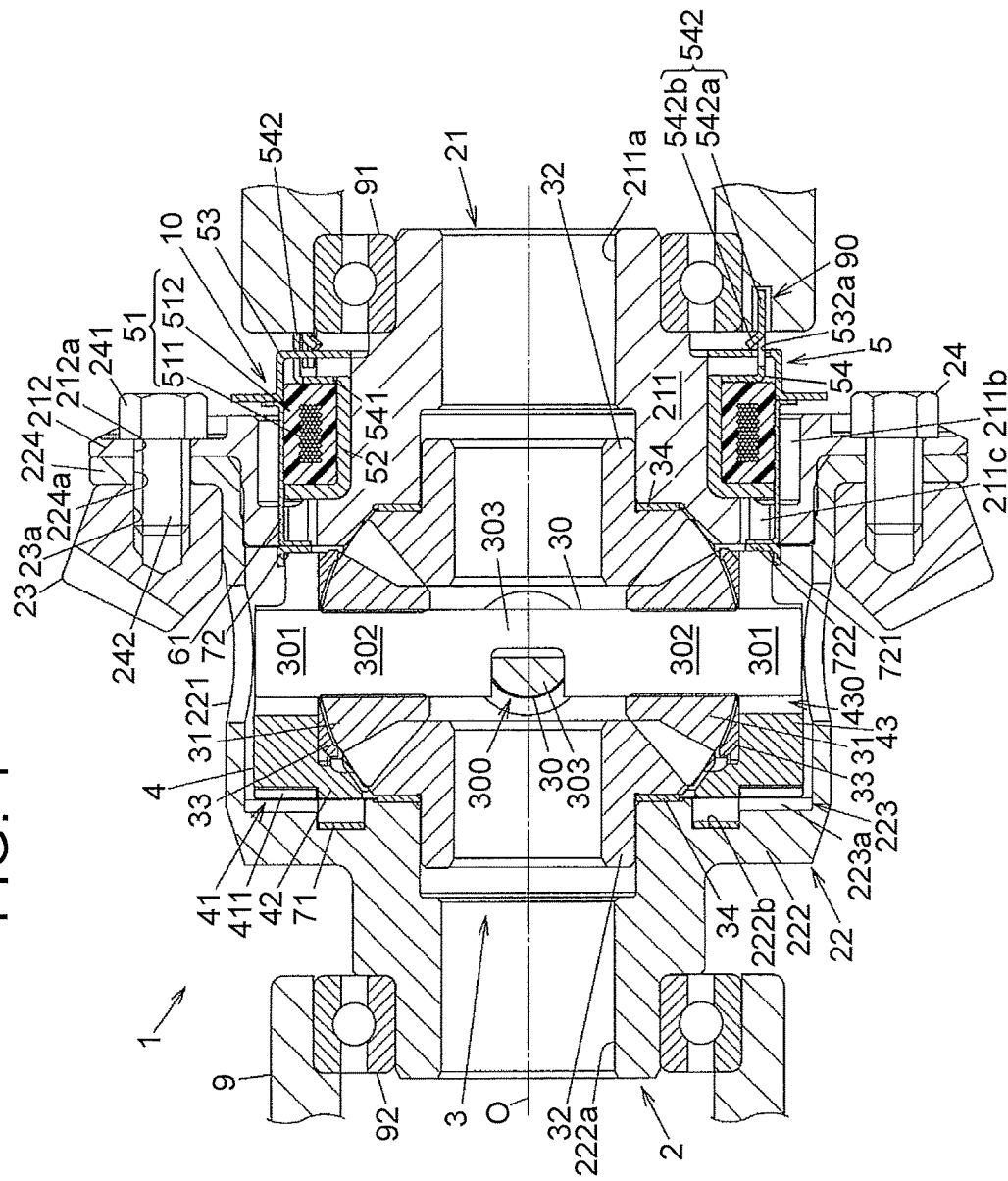
FIG. 1 is a cross-sectional view of a configuration example of a differential according to a first embodiment of the disclosure.

A description will be made on an embodiment of the disclosure with reference to FIG. 1 to FIG. 6. Note that the embodiment described below illustrates a preferred example for carrying out the disclosure. While some parts of the embodiment specifically exemplify various technical matters that are technically preferred, the technical scope of the disclosure is not limited to this specific aspect.

This differential 1 is used to permit differential motion of paired output shafts to distribute drive power of a drive source, such as an engine of a vehicle, thereto. More specifically, the differential 1 according to this embodiment is mounted on a four-wheel-drive vehicle that includes: a right and left pair of primary drive wheels (for example, front wheels), to which the drive power of the drive source is constantly transmitted; and a right and left pair of auxiliary drive wheels (rear wheels, for example), to which the drive power of the drive source is transmitted in accordance with a travel state, and is used as a differential device that distributes the drive power to the right and left wheels of the auxiliary drive wheels. When the drive power is transmitted only to the primary drive wheels, the vehicle is in a two-wheel-drive state. When the drive power is transmitted to the primary drive wheels and the auxiliary drive wheels, the vehicle is in a four-wheel-drive state. In the four-wheel-drive state, the differential 1 distributes the received drive power to right and left driveshafts on the auxiliary drive wheel side.

The differential 1 includes: a differential case 2 that is rotatably supported by a differential carrier 9 fixed to a vehicle body via paired bearings 91, 92; a differential mechanism 3 accommodated in the differential case 2; an intermittent member 4 that intermittently transmits the drive power between the differential case 2 and a pinion shaft 30 of the differential mechanism 3; an actuator 5 that makes the intermittent member 4 move in an axial direction; an intervening member 61 that intervenes between the intermittent member 4 and the actuator 5 and transmits a moving force of the actuator 5 to the intermittent member 4; and a wave washer 71 as an urging member that urges the intermittent member 4 to the actuator 5 side. Of these, the intermittent member 4, the actuator 5, and the intervening member 61 constitute an interrupter 10 that interrupts transmission of the drive power between the pinion shaft 30 as a first rotary member and the differential case 2 as a second rotary member.

The differential mechanism 3 has: the pinion shaft 30, to which the drive power is transmitted from the differential case 2 via the intermittent member 4; plural (four) pinion gears 31 that are rotatably supported about a rotational axis O of the differential case 2; and paired side gears 32 as paired output members. During non-actuation of the actuator 5, the pinion shaft 30 can rotate relative to the differential case 2 about the common rotational axis O. The differential mechanism 3 outputs the drive power, which is transmitted to the pinion shaft 30, from the side gears 32 while permitting the differential motion thereof. In the following description, the axial direction is a direction parallel to the rotational axis O.

In this embodiment, the differential mechanism 3 has the paired pinion shafts 30. Of the four pinion gears 31, two pinion gears 31 are pivotally supported on one of the pinion shafts 30, and the other two pinion gears 31 are pivotally supported on the other pinion shaft 30. The pinion gears 31 and the side gears 32 are formed as bevel gears and mesh with each other while gear shafts intersect with each other at right angles. The right and left driveshafts are respectively coupled to the side gears 32 in a manner to inhibit relative rotation. Note that, although plural gear teeth are formed on each of the pinion gears 31 and the side gears 32, these gear teeth are not shown in FIG. 3.

Figure 3:
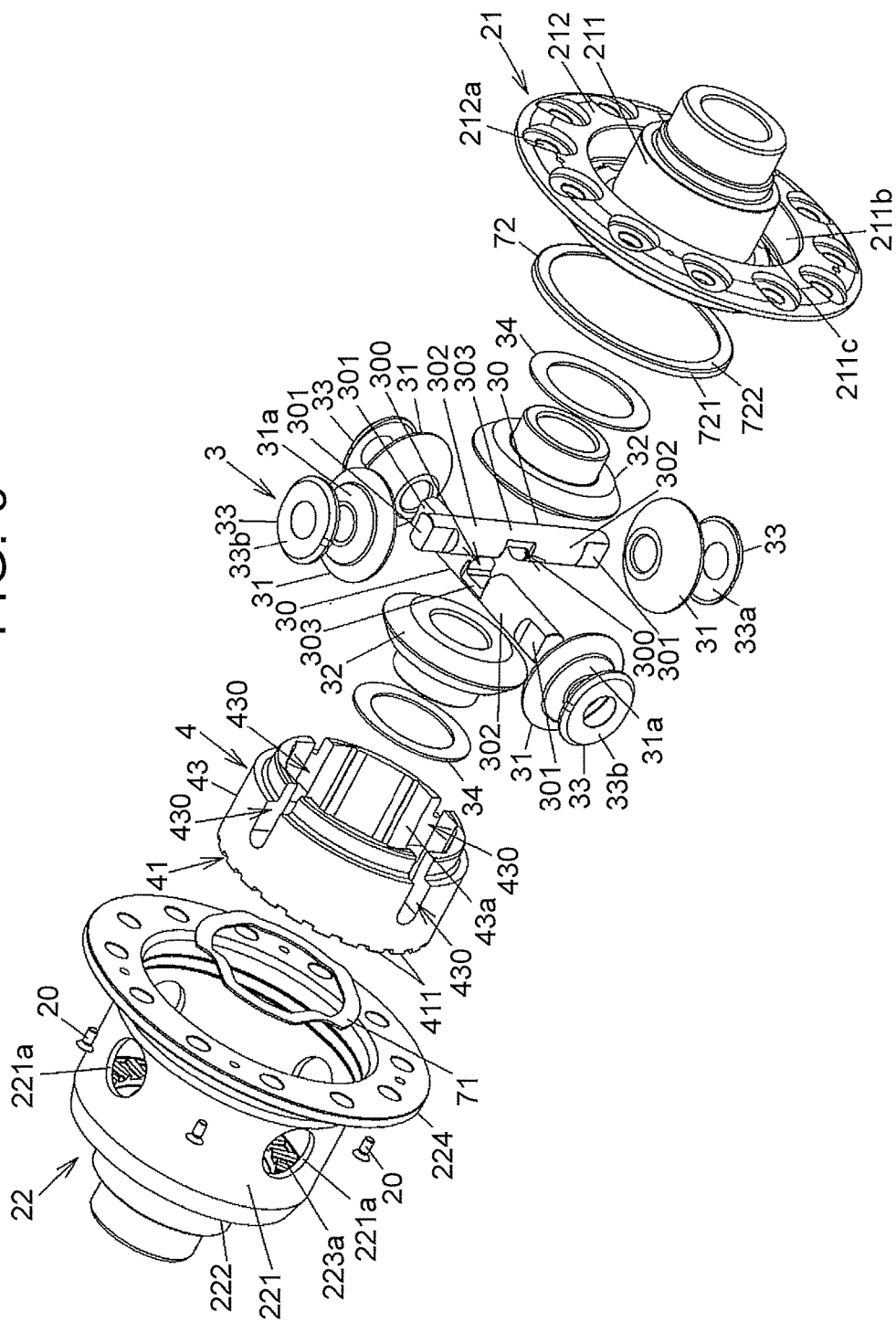
FIG. 3 is an exploded perspective view of the differential except for the actuator and an intervening member.
Figure 4:
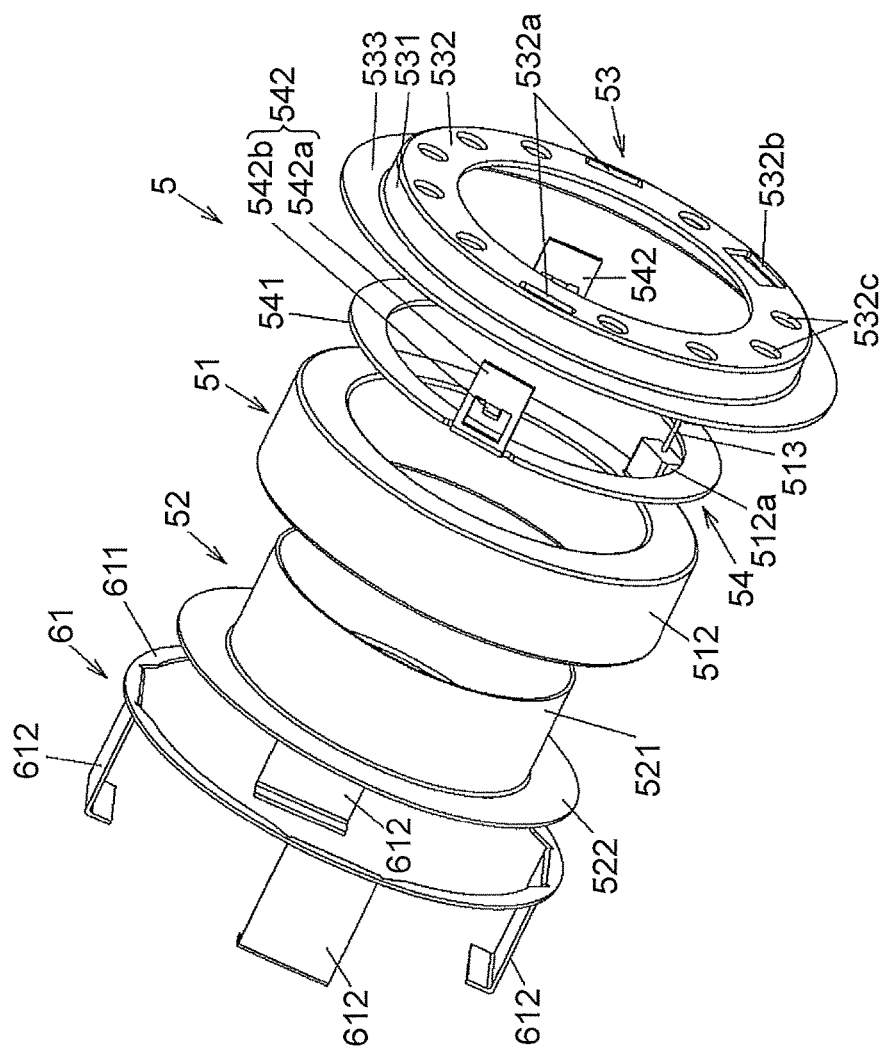
FIG. 4 is an exploded perspective view of the actuator and the intervening member.
Figure 5:
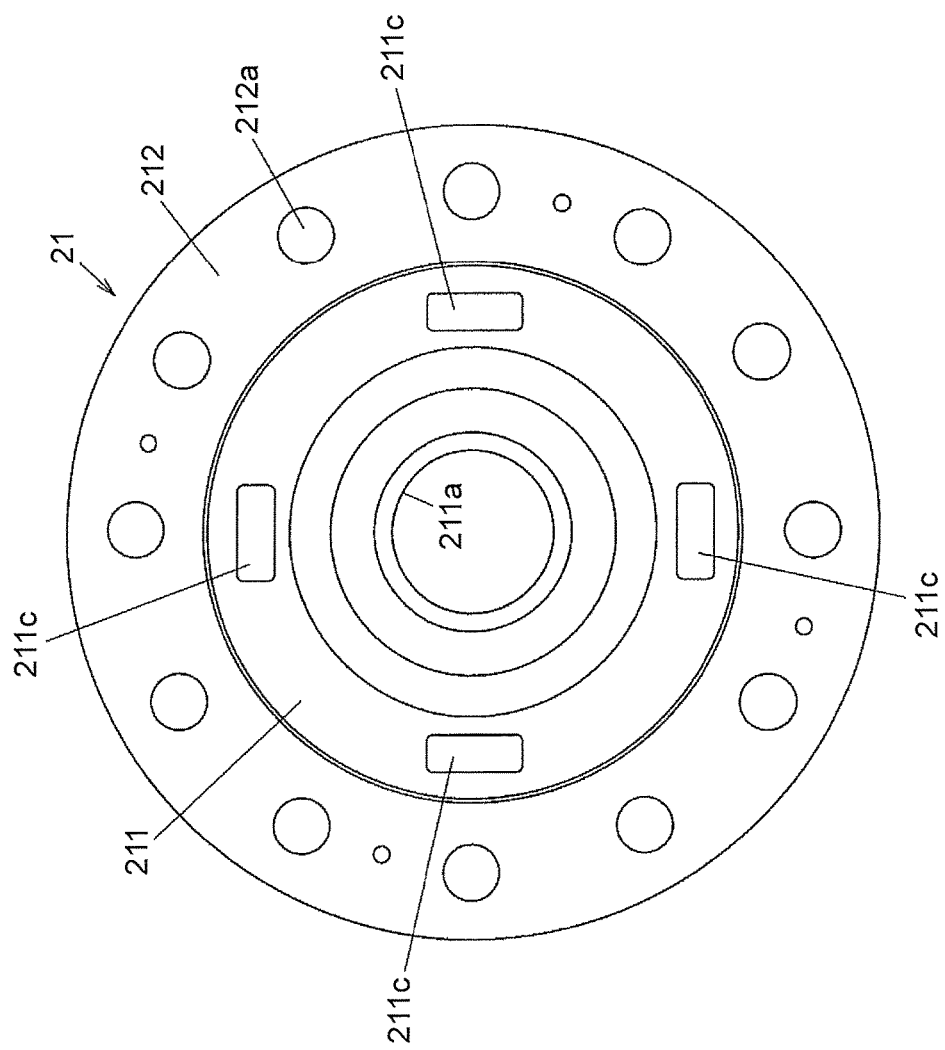
FIG. 5 is a plan view in which an inner surface of a first case member of a differential case is seen in an axial direction.

As shown in FIG. 3, each of the pinion shafts 30 integrally has: paired engaged sections 301 engaged with the intermittent member 4; paired pinion gear support sections 302 respectively inserted through the pinion gears 31; and a coupling section 303 that couples the pinion gear support sections 302, and is in a shaft shape. The engaged sections 301 are respectively provided at both ends of the pinion shaft 30, and the coupling section 303 is provided at a center of the pinion shaft 30 in the axial direction. Each of the pinion gear support sections 302 is provided between one of the engaged sections 301 and the coupling section 303 and pivotally supports the pinion gear 31.

The pinion shafts 30 mesh with each other at the centers thereof in the axial direction. More specifically, the coupling section 303 of the one pinion shaft 30 is fitted to a recessed section 300 that is formed between the pinion gear support sections 302 on the other pinion shaft 30, and the coupling section 303 of the other pinion shaft 30 is fitted to the recessed section 300 that is formed between the pinion gear support sections 302 on the one pinion shaft 30. The pinion shafts 30 intersect with each other at the right angles when seen along the rotational axis O of the differential case 2.

The intermittent member 4 has a cylindrical shape whose center axis matches the rotational axis O of the differential case 2, and is formed by forging a steel material. The intermittent member 4 can move relative to the pinion shaft 30 of the differential mechanism 3 in a center axis direction along the rotational axis O of the differential case 2 but is restricted from making relative rotation thereto.

The intermittent member 4 integrally has: a first meshing section 41 that has plural meshing teeth 411 provided at an end in the center axis direction; a ring-shaped inner flange section 42 that is projected inward from the first meshing section 41; and a cylindrical section 43 that is formed with an engaging section 430, with which the pinion shaft 30 is engaged in a peripheral direction. The first meshing section 41 meshes with a second meshing section 223 (will be described later) that is provided in the differential case 2 in the peripheral direction. An axial end surface of the inner flange section 42 abuts the wave washer 71 and receives an urging force of the wave washer 71. The engaging section 430 is formed as a groove that penetrates a portion between inner and outer peripheral surfaces of the cylindrical section 43 and extends in the center axis direction of the intermittent member 4.

The engaged section 301, which is provided at each of the ends of the pinion shaft 30, is engaged with the engaging section 430. When the engaged section 301 of the pinion shaft 30 is engaged with the engaging section 430 of the intermittent member 4, the intermittent member 4 can move relative to the pinion shaft 30 in the center axis direction along the rotational axis O but cannot make the relative rotation thereto. The plural pinion gears 31 can rotate (revolve) with the intermittent member 4 about the rotational axis O of the differential case 2. In this embodiment, because the engaged sections 301, which are provided at both of the ends of the pinion shafts 30, are engaged with the intermittent member 4, the cylindrical section 43 is formed with the four engaging sections 430.

A washer 33 is disposed between a back surface 31a of each of the pinion gears 31 and an inner peripheral surface 43a of the cylindrical section 43 of the intermittent member 4. An inner surface 33a of the washer 33 that opposes the back surface 31a of the pinion gear 31 has a partially spherical shape, and an outer surface 33b thereof that opposes the inner peripheral surface 43a of the cylindrical section 43 of the intermittent member 4 has a planar shape. When the pinion gear 31 rotates (revolves) about the pinion shaft 30, the back surface 31a of the pinion gears 31 slides on the inner surface 33a of the washer 33. When the intermittent member 4 moves in the center axis direction relative to the pinion shaft 30, the inner peripheral surface 43a of the cylindrical section 43 of the intermittent member 4 slides on the outer surface 33b of the washer 33. A portion of the inner peripheral surface 43a of the cylindrical section 43 that slides on the outer surface 33b of the washer 33 is formed in a planar shape.

The intervening member 61 has: a ring section 611 that is disposed outside the differential case 2; and plural projected shafts 612, each of which extends from the ring section 611 in the axial direction. In this embodiment, the four projected shafts 612 are provided in the intervening member 61. The intervening member 61 is formed of the non-magnetic body and is formed by pressing a steel sheet made of austenitic stainless steel, for example. A tip (an opposite end from a base end on the ring section 611 side) of the projected shaft 612 is bent to an inner diameter side.

A washer 72 with an L-shaped cross section is disposed between the tip of the projected shaft 612 and the cylindrical section 43 of the intermittent member 4. The washer 72 has: a cylindrical tube section 721; and a disc section 722 that extends inward from one axial end of the tube section 721. The tube section 721 is fitted onto the cylindrical section 43 of the intermittent member 4. The tip of the projected shaft 612 abuts the disc section 722 of the washer 72.

The actuator 5 has: an annular electromagnet 51 that has a coil 511 generating magnetic flux when being energized and a resin member 512 covering the coil 511; a coil housing 52 that holds the electromagnet 51; a plunger 53 that moves with the intermittent member 4 in the axial direction; and a detent member 54 that restricts axial movement and rotation of the coil housing 52 relative to the differential carrier 9.

The electromagnet 51, the coil housing 52, the plunger 53, and the detent member 54 are disposed outside the differential case 2. A cross-sectional shape of the electromagnet 51 along the rotational axis O is rectangular, and the coil 511 is held in the coil housing 52 via the resin member 512. The electromagnet 51 is formed by molding the coil 511, which is formed by winding enameled wire, for example, with the resin member 512.

By using a magnetic force that is generated by energization of the coil 511, the plunger 53 makes the intermittent member 4 move in such a direction that the first meshing section 41 meshes with the second meshing section 223 of the differential case 2. The first meshing section 41 of the intermittent member 4 meshes with the second meshing section 223 by the moving force of the actuator 5 that is transmitted via the intervening member 61.

The coil 511 of the electromagnet 51 is supplied with an excitation current from an unillustrated controller via electric wire 513 that is led out of a boss section 512a provided in the resin member 512. The actuator 5 is actuated when the excitation current is supplied to the coil 511. The coil housing 52 is formed of soft magnetic metal such as low-carbon steel and integrally has: a cylindrical section 521 that covers an inner peripheral surface of the resin member 512 of the electromagnet 51 from inside; and a wall section 522 in a shape of a ring-shaped plate that extends in a radial direction from one axial end of the cylindrical section 521 and covers one axial end surface of the resin member 512. The cylindrical section 521 has a cylindrical shape with the rotational axis O being a center axis and is disposed between the differential case 2 and the resin member 512. The wall section 522 extends outward from the one end of the cylindrical section 521.

The cylindrical section 521 of the coil housing 52 is formed such that an inner diameter thereof is slightly larger than an outer diameter of a portion of the differential case 2 that opposes an inner peripheral surface of this cylindrical section 521. In this way, the differential case 2 can freely rotate relative to the coil housing 52. The wall section 522 is formed such that an outer diameter thereof is smaller than an inner diameter of the ring section 611 of the intervening member 61.

The detent member 54 is fixed to an end of the cylindrical section 521 of the coil housing 52 on an opposite side from the wall section 522. The detent member 54 is formed of a non-magnetic body such as the austenitic stainless steel and integrally has: an annular section 541 that is disposed on an outer periphery of the cylindrical section 521 of the coil housing 52; and paired projected sections 542 that are projected in the axial direction from two positions in the annular section 541 in the peripheral direction. The annular section 541 is fixed to an outer peripheral surface of the cylindrical section 521 of the coil housing 52 by welding, for example.

The projected sections 542 are respectively fitted to recessed sections 90 that are formed in the differential carrier 9, and the detent member 54 thereby stops rotation of the coil housing 52. In addition, the projected sections 542 are respectively inserted through axial insertion holes 532a that are formed in the plunger 53, and thereby stop rotation of the plunger 53 relative to the coil housing 52 and the differential carrier 9. Each of the projected sections 542 has: a flat plate section 542a that is inserted through the insertion hole 532a of the plunger 53; and a locking projection 542b that is disposed on the recessed section 90 side of the differential carrier 9 from the insertion holes 532a and restricts axial movement of the plunger 53 relative to the coil housing 52. In this embodiment, the locking projection 542b is formed by cutting and raising a part of the plate section 542a.

The plunger 53 is formed of a soft magnetic body such as the low-carbon steel and integrally has: an outer ring section 531 in an annular shape that is disposed on an outer periphery of the electromagnet 51; a lateral plate section 532 that is projected inward from one axial end of the outer ring section 531; and a flange section 533 that is projected outward from the other axial end of the outer ring section 531. The outer ring section 531 has a cylindrical shape that covers the electromagnet 51 from the outer peripheral side. The ring section 611 of the intervening member 61 abuts the flange section 533 by the urging force of the wave washer 71.

An inner peripheral surface of the outer ring section 531 is in contact with an outer peripheral surface of the resin member 512 of the electromagnet 51, and the plunger 53 is thereby supported by the electromagnet 51. When the plunger 53 moves in the axial direction, the inner peripheral surface of the outer ring section 531 slides on the outer peripheral surface of the resin member 512. That is, the inner peripheral surface of the outer ring section 531 is in contact with the outer peripheral surface of the resin member 512 of the electromagnet 51, and the plunger 53 is thereby supported by the resin member 512 in the radial direction.

The lateral plate section 532 of the plunger 53 is formed with: the two insertion holes 532*a*, through which the projected sections 542 of the detent member 54 are respectively inserted; a through hole 532*b* that is penetrated by the boss section 512*a* of the electromagnet 51; and plural (ten in the example shown in FIG. 4) oil holes 532*c*, through which lubricant flows. The rotation of the electromagnet 51 relative to the coil housing 52 is stopped when the boss section 512*a* penetrates the through hole 532*b*.

The differential case 2 includes a first case member 21 in a disc shape and a second case member 22 in a bottomed cylindrical shape. The first case member 21 closes an opening of the second case member 22. A washer 34 in an annular plate shape is disposed between the side gears 32 in the differential mechanism 3 and each of the first case member 21 and the second case member 22. The first case member 21 is formed of a soft magnetic body. As a specific material, for example, carbon steel such as S45C, chromium molybdenum steel such as SCM445, or the low-carbon steel such as S10C can be suitably used. The lubricant (differential oil) that lubricates the differential mechanism 3 is introduced in the differential case 2.

Figure 6:
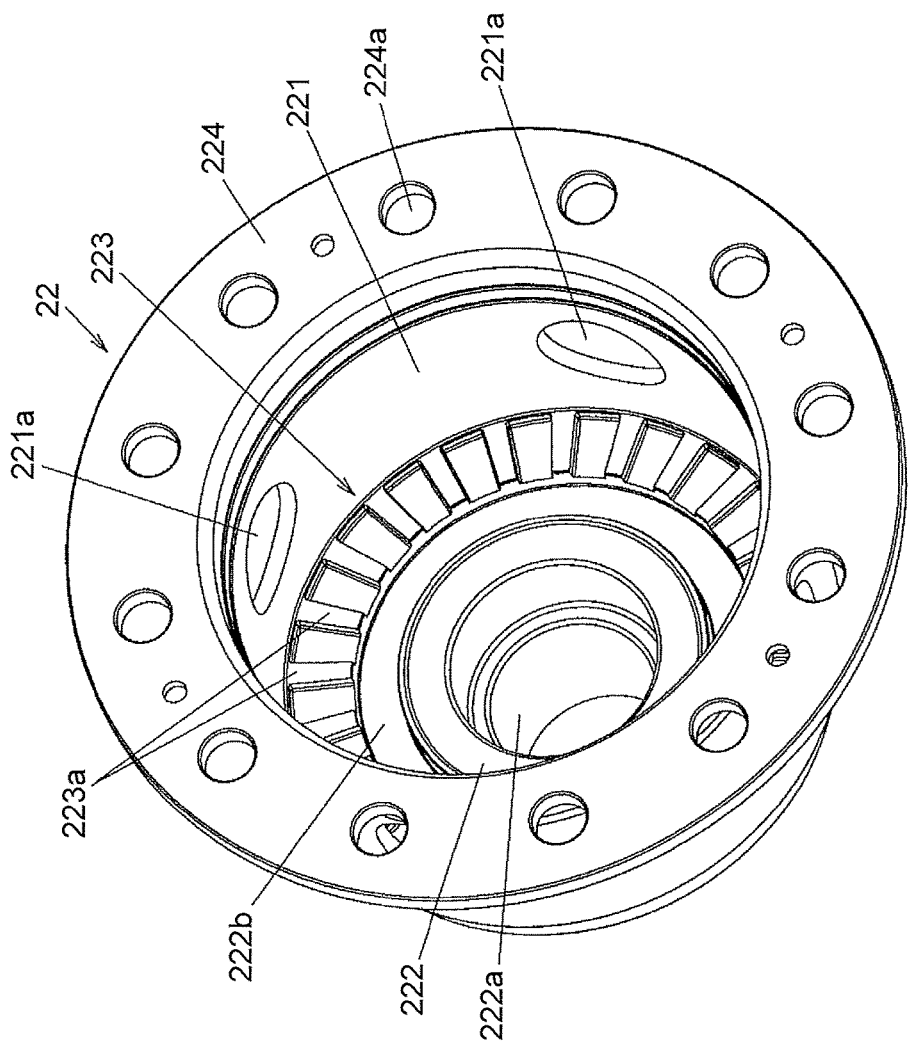
FIG. 6 is a perspective view of a second case member of the differential case.

As shown in FIG. 6, the second case member 22 integrally has: a cylindrical section 221 that accommodates the differential mechanism 3 and the intermittent member 4; a bottom section 222 that extends inward from one axial end of the cylindrical section 221; the second meshing section 223 that meshes with the first meshing section 41 of the intermittent member 4; and a flange section 224 that extends outward from the other axial end of the cylindrical section 221. The cylindrical section 221 is formed with plural oil holes 221*a*, through which the lubricant flows. The bottom section 222 is formed with: a shaft insertion hole 222*a*, in which the driveshaft coupled to one of the side gears 32 in the manner to inhibit the relative rotation thereto is inserted; and an annular groove 222*b* that accommodates the wave washer 71.

The second meshing section 223 includes plural meshing teeth 223*a* that are provided at equally spaced intervals along the peripheral direction, and is provided on the bottom section 222 side of the second case member 22. In this embodiment, the plural meshing teeth 223*a* are projected in the axial direction from an inner surface of the bottom section 222. The wave washer 71 urges the intermittent member 4 in a direction to separate from the bottom section 222 of the second case member 22.

The first case member 21 integrally has: a disc section 211 that opposes the bottom section 222 of the second case member 22 in the axial direction; and a flange section 212 that abuts the flange section 224 on the second case member 22 side. The flange section 212 of the first case member 21 and the flange section 224 of the second case member 22 are joined to each other by plural screws 20. The disc section 211 is formed with a shaft insertion hole 211*a*, in which the driveshaft coupled to the other of the side gears 32 in the manner to inhibit the relative rotation thereto is inserted. The disc section 211 is also formed with: an annular groove 211*b* that is recessed in the axial direction from an outer surface thereof on an opposite side of an opposing surface to the bottom section 222 of the second case member 22; and plural through holes 211*c*, each of which communicates with the annular groove 211*b* and penetrates the disc section 211 in the axial direction.

The electromagnet 51, the coil housing 52, and the intervening member 61 are partially accommodated in the annular groove 211*b* of the first case member 21. The ring section 611 of the intervening member 61 is disposed in the annular groove 211*b*, and the plural projected shafts 612 thereof are respectively inserted through the plural through holes 211*c* of the first case member 21. The plural projected shafts 612 are respectively inserted through the through holes 211*c*, and the intervening member 61 is thereby supported by the first case member 21 in the radial direction. That is, when the projected shafts 612 respectively abut inner surfaces of the through holes 211*c*, a radial position of the intervening member 61 relative to the first case member 21 is determined.

The differential case 2 receives the drive power from a ring gear 23 (see FIG. 1) that is fixed to the flange sections 212, 224 of the first and second case members 21, 22. The ring gear 23 is fixed to an outer periphery of the cylindrical section 221 on the flange section 224 side in the second case member 22. In this embodiment, the ring gear 23 is fixed to the differential case 2 so as to rotate integrally by plural fastening bolts 24 that are respectively inserted through plural bolt insertion holes 212*a* formed in the flange section 212 of the first case member 21 and plural bolt insertion holes 224*a* formed in the flange section 224 of the second case member 22. A head 241 of each of the fastening bolts 24 abuts the flange section 212 of the first case member 21. A shaft 242 formed with a male screw is inserted through the bolt insertion holes 212*a*, 224*a* and is screwed to a screw hole 23*a* of the ring gear 23.

The ring section 611 of the intervening member 61 abuts the flange section 533 of the plunger 53 and receives the moving force in the axial direction from the plunger 53. When the coil 511 of the electromagnet 51 is energized, the magnetic flux is generated in a magnetic path M, which is indicated by a broken line in FIG. 2B. Then, the plunger 53 presses the intermittent member 4 via the intervening member 61 and makes the intermittent member 4 move in the axial direction.

The flange section 533 of the plunger 53 is formed to have a larger diameter than the ring section 611 of the intervening member 61 and bulges outward from the ring section 611. A portion of the flange section 533 on an outer diameter side of the ring section 611 opposes an axial end surface 211*d* of the first case member 21 on an outer diameter side of the annular groove 211*b*. That is, a first air gap G1 is formed between the axial end surface 211*d* of the first case member 21 and an opposing surface 533*a* of the flange section 533 that opposes this axial end surface 211*d* in the axial direction.

The lateral plate section 532 of the plunger 53 is formed such that an inner diameter thereof is larger than a diameter of a peripheral surface 211e of the annular groove 211b on the inner diameter side in the first case member 21. The peripheral surface 211e is an outer peripheral surface of the disc section 211 in the first case member 21.

When the coil 511 is not energized, the lateral plate section 532 of the plunger 53 is located outside (on the bearing 91 side of) the annular groove 211b. When the coil 511 is energized and the plunger 53 moves to the left in the axial direction (see FIG. 2B), an inner peripheral surface 532d of the lateral plate section 532 faces the peripheral surface 211e while keeping a specified clearance therefrom in the radial direction. The inner peripheral surface 532d of the lateral plate section 532 is an inner end surface of the plunger 53. That is, a second air gap G2 is formed between the peripheral surface 211e of the first case member 21 and the inner peripheral surface 532d of the lateral plate section 532 of the plunger 53. In other words, the second air gap G2 is formed between the peripheral surface 211e of the first case member 21 and the inner peripheral surface 532d of the lateral plate section 532 of the plunger 53 with a specified distance in the radial direction.

Figure 2A:
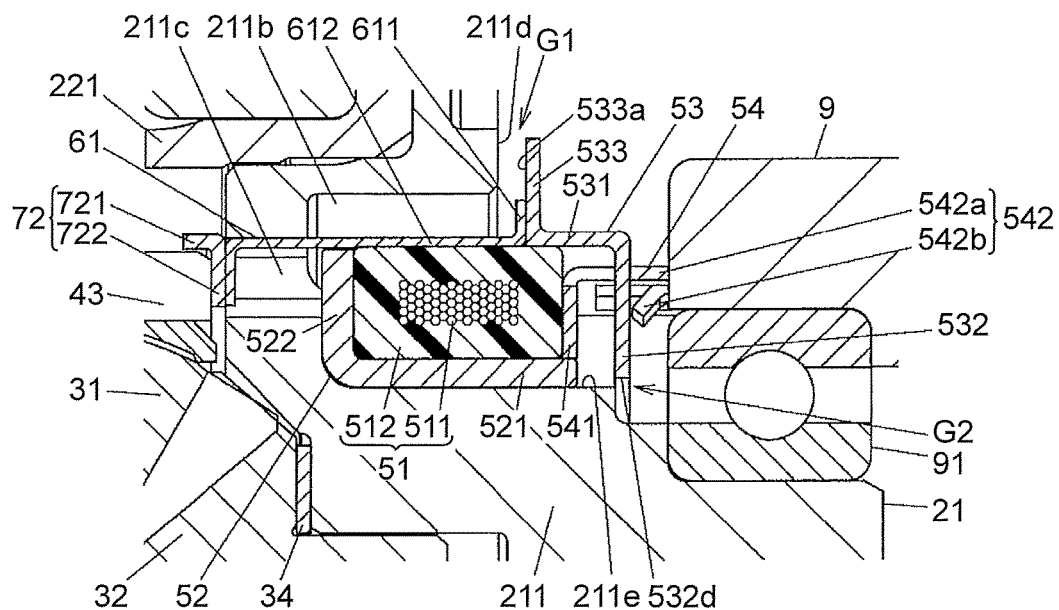
FIG. 2A is a partially enlarged view of FIG. 1, showing a non-actuated state of an actuator.
Figure 2B:
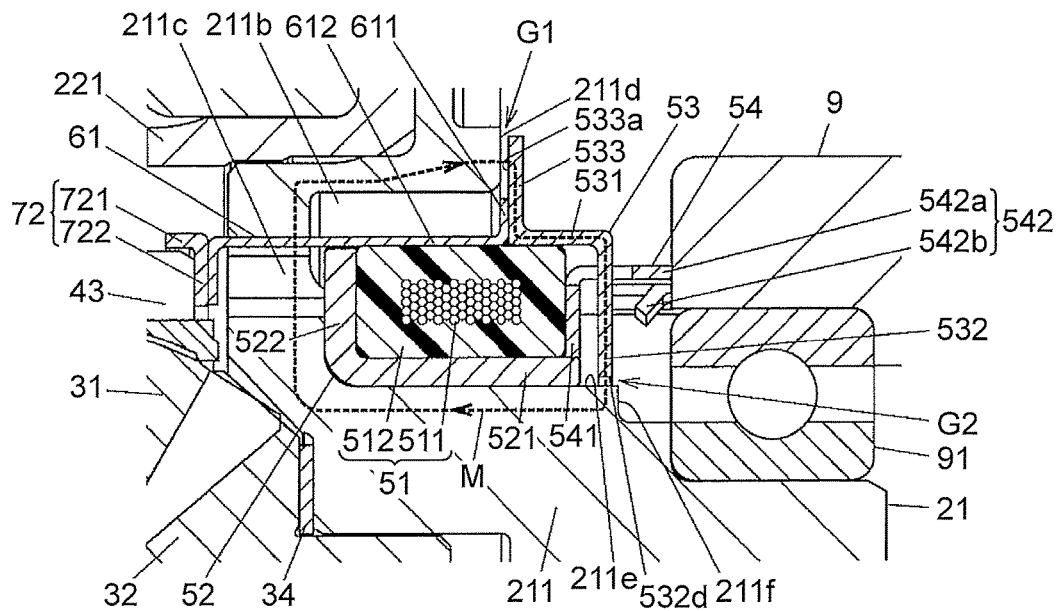
FIG. 2B is a partially enlarged view of FIG. 1, showing an actuated state of the actuator.

The first case member 21 and the plunger 53 constitute the magnetic path M of the magnetic flux of the coil 511 and can move relative to each other in the axial direction via the first and second air gaps G1, G2. In FIG. 2B, a direction of the magnetic flux in the magnetic path M is indicated by an arrow. The magnetic flux of the coil 511 passes through the first and second air gaps G1, G2. More specifically, when the coil 511 is energized, the magnetic flux is introduced from one of the first and second air gaps G1, G2 (the first air gap G1 in this embodiment) to the plunger 53, and the magnetic flux is led out of the plunger 53 to the other air gap (the second air gap G2 in this embodiment). Note that the direction of the magnetic flux in the magnetic path M is determined in accordance with a direction of the current flowing through the coil 511.

In this embodiment, when the coil 511 is energized, the plunger 53 moves in the axial direction in a manner to reduce the first air gap G1. Note that axial length of the outer ring section 531 may be extended, an inner diameter of the lateral plate section 532 may be reduced, and a part of the lateral plate section 532 may thereby oppose an axial end surface 211f (see FIG. 2B) of the first case member 21 on the inner diameter side from the annular groove 211b. In this case, the second air gap G2 is formed between the lateral plate section 532 of the plunger 53 and the axial end surface 211f of the first case member 21, and, when the coil 511 is energized, the plunger 53 moves in the axial direction in a manner to reduce the first and second air gaps G1, G2.

The plunger 53 is supported by the resin member 512 of the electromagnet 51 in the radial direction, and the second air gap G2 is thereby maintained. In addition, as it is apparent from FIGS. 2A and 2B, the wall section 522 of the coil housing 52 and the plunger 53 are spaced apart from each other with a clearance larger than the first air gap G1, and the cylindrical section 521 of the coil housing 52 and the plunger 53 are spaced apart from each other with a clearance larger than the second air gap G2. In this way, the magnetic flux, which is generated by the energization of the coil 511, mainly passes through the plunger 53 and the first case member 21.

(Operation of the Differential 1)

By actuation and non-actuation of the actuator 5, the differential 1 is switched between a coupled state where the first meshing section 41 and the second meshing section 223 mesh with each other in the peripheral direction and the intermittent member 4 and the differential case 2 are coupled in the manner to inhibit the relative rotation and an uncoupled state where the intermittent member 4 and the differential case 2 can make the relative rotation.

During the non-actuation of the actuator 5 when the excitation current is not supplied to the coil 511 of the electromagnet 51, the intermittent member 4 moves to the disc section 211 side of the first case member 21 by resilience of the wave washer 71, and meshing between the first meshing section 41 and the second meshing section 223 is canceled. Because the differential case 2 and the intermittent member 4 can make the relative rotation during this non-actuation of the actuator 5, the transmission of the drive power from the differential case 2 to the pinion shaft 30 of the differential mechanism 3 is cut off. In this way, the drive power that is received by the differential case 2 from the ring gear 23 is not transmitted to the driveshaft, and the vehicle is brought into the two-wheel-drive state.

On the other hand, when the excitation current is supplied to the coil 511 of the electromagnet 51, the magnetic flux is generated in the magnetic path M, which is indicated by the broken line in FIG. 2B. Then, the plunger 53 moves in the axial direction by the magnetic force of the electromagnet 51 in the manner to reduce the first air gap G1. In this way, the intermittent member 4 is pressed to the bottom section 222 side of the second case member 22, and the first meshing section 41 and the second meshing section 223 mesh with each other. Just as described, the intermittent member 4 can move in the axial direction between a coupled position where the meshing teeth 411 mesh with the second meshing section 223 of the differential case 2 and an uncoupled position where the meshing teeth 411 do not mesh with the second meshing section 223 of the differential case 2.

When the first meshing section 41 and the second meshing section 223 mesh with each other, the drive power that is received by the second case member 22 of the differential case 2 from the ring gear 23 is transmitted to the driveshafts via the intermittent member 4, the pinion shafts 30 of the differential mechanism 3, the four pinion gears 31, and the side gears 32, and the vehicle is brought into the four-wheel-drive state.

(Action and Effects of the First Embodiment)

According to the first embodiment that has been described so far, the first case member 21 and the plunger 53 can move relative to each other in the axial direction via the first and second air gaps G1, G2, and the plunger 53 moves in the axial direction relative to the first case member 21 by the magnetic flux that passes through the first and second air gaps G1, G2. Accordingly, compared to a case where the plunger 53 moves by the magnetic flux that is generated in a magnetic path including the coil housing 52, for example, magnetoresistance in the magnetic path can be reduced. That is, when the plunger 53 moves by the magnetic flux that is generated in the magnetic path including the first case member 21 and the coil housing 52, the magnetoresistance is generated in an air gap formed between the first case member 21 and the coil housing 52, in addition to the first and second air gaps G1, G2. However, according to this embodiment, because this air gap is not generated, the magnetoresistance in the magnetic path can be reduced.

In addition, if the magnetic path does not include the first case member 21 and the magnetic path is only formed by the coil housing 52 and the plunger 53, thickness of each of the cylindrical section 521 and the wall section 522 has to be secured so as to prevent magnetic saturation of the coil housing 52. However, according to this embodiment, the magnetic path M is defined by the first case member 21 and the plunger 53. Thus, size and weight of the differential 1 and the interrupter 10 can be reduced by thinning the coil housing 52.

Furthermore, according to this embodiment, because the plunger 53 is supported by the resin member 512 of the electromagnet 51 in the radial direction, the actuator 5 can have the simple configuration. Moreover, according to this embodiment, because the non-magnetic intervening member 61 is interposed between the plunger 53 and the intermittent member 4, leakage of the magnetic flux that is introduced to the plunger 53 to the intermittent member 4 side can be prevented.

Second Embodiment

Next, a description will be made on a second embodiment of the disclosure with reference to FIG. 7 to FIG. 11B.

A differential 1A includes: a differential case 2A that is rotatably supported by a differential carrier 9A via paired bearings 93, 94; a differential mechanism 3A accommodated in the differential case 2A; an intermittent member 4A that can intermittently transmit the drive power between the differential case 2A and a first side gear 37 of the differential mechanism 3A; an actuator 5A that makes the intermittent member 4A move; an intervening member 62 that intervenes between the intermittent member 4A and the actuator 5A and transmits a moving force of the actuator 5A to the intermittent member 4A; a wave washer 73 as an urging member that urges the intermittent member 4A to the actuator 5A side; and a position sensor 100 that outputs an electrical signal indicative of an operation state of the actuator 5A. Of these, the intermittent member 4A, the actuator 5A, and the intervening member 62 constitute an interrupter 10A that interrupts coupling of the differential case 2A as the first rotary member and the first side gear 37 as the second rotary member.

The differential mechanism 3A includes: plural (five in this embodiment) pinion gear pairs 3B, in each of which a first pinion gear. 35 and a second pinion gear 36 mesh with each other; and the first side gear 37 and a second side gear 38 as paired output members. During non-actuation of the actuator 5A, the first and second side gears 37, 38 can rotate relative to the differential case 2A about the common rotational axis O. The differential mechanism 3A outputs the drive power, which is received from the differential case 2A, from the first and second side gears 37, 38 while permitting the differential motion thereof.

Each of the first side gear 37 and the second side gear 38 has a cylindrical shape. An inner peripheral surface of the first side gear 37 is formed with a spline-fitted section 370, to which one of the right and left driveshafts is coupled in a manner to inhibit relative rotation thereto. An inner peripheral surface of the second side gear 38 is formed with a spline-fitted section 380, to which the other driveshaft is coupled in a manner to inhibit relative rotation thereto.

The differential case 2A is formed with plural holding holes 200, each of which rotatably holds the first pinion gear 35 and the second pinion gear 36 of the pinion gear pair 3B. The first pinion gear 35 and the second pinion gear 36 revolve about the rotational axis O and can rotate in the holding hole 200 with center axes thereof being rotational axes.

Figure 7:
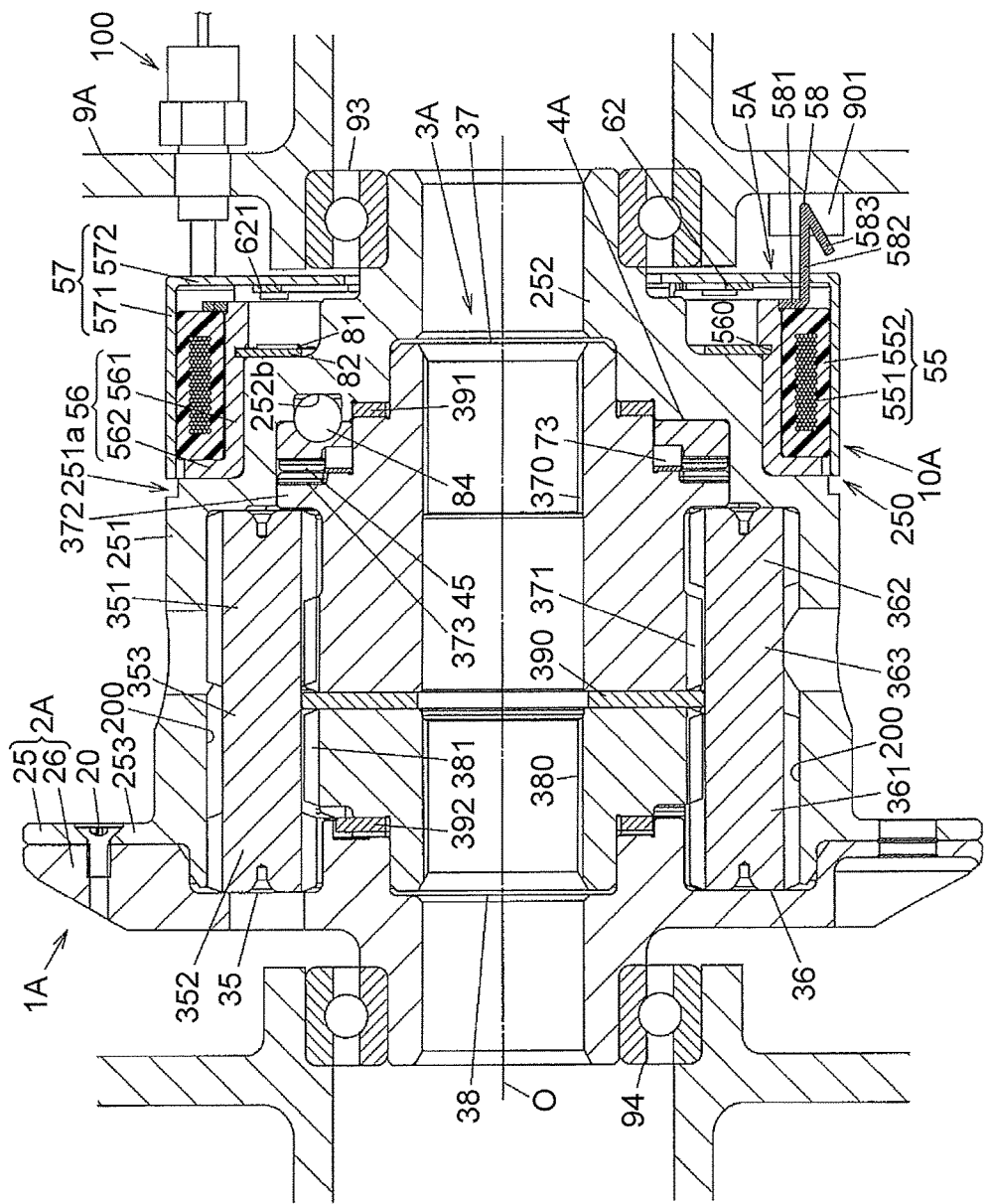
FIG. 7 is a cross-sectional view of a configuration example of a differential according to a second embodiment of the disclosure.

The first side gear 37 and the second side gear 38 have a common outer diameter, and outer peripheral surfaces thereof are respectively formed with gear sections 371, 381, each of which includes plural helical teeth. As shown in FIG. 7, in the first side gear 37, plural meshing teeth 373 that mesh with a meshing section 45 (will be described later) of the intermittent member 4A are formed in an annular wall section 372 that is projected to an outer peripheral side from the gear section 371. A center washer 390 is disposed between the first side gear 37 and the second side gear 38. A first side washer 391 is disposed on a side of the first side gear 37, and a second side washer 392 is disposed on a side of the second side gear 38.

The first pinion gear 35 integrally has a long gear section 351, a short gear section 352, and a coupling section 353 that couples the long gear section 351 and the short gear section 352 in the axial direction. Similarly, the second pinion gear 36 integrally has a long gear section 361, a short gear section 362, and a coupling section 363 that couples the long gear section 361 and the short gear section 362 in the axial direction.

The long gear section 351 of the first pinion gear 35 meshes with the gear section 371 of the first side gear 37 and the short gear section 362 of the second pinion gear 36, and the short gear section 352 thereof meshes with the long gear section 361 of the second pinion gear 36. The long gear section 361 of the second pinion gear 36 meshes with the gear section 381 of the second side gear 38 and the short gear section 352 of the first pinion gear 35, and the short gear section 362 thereof meshes with the long gear section 351 of the first pinion gear 35. Note that the helical teeth of each of these gear sections are not shown in FIG. 10.

When the first side gear 37 and the second side gear 38 rotate at the same speed, the first pinion gear 35 and the second pinion gear 36 do not rotate in the holding hole 200 but revolve with the differential case 2A. In addition, when rotational speeds of the first side gear 37 and the second side gear 38 differ during turning of the vehicle or the like, for example, the first pinion gear 35 and the second pinion gear 36 revolve while rotating in the holding hole 200. In this way, the drive power that is received by the differential case 2A is distributed to the first side gear 37 and the second side gear 38 while the differential motion thereof is permitted.

Figure 8A:
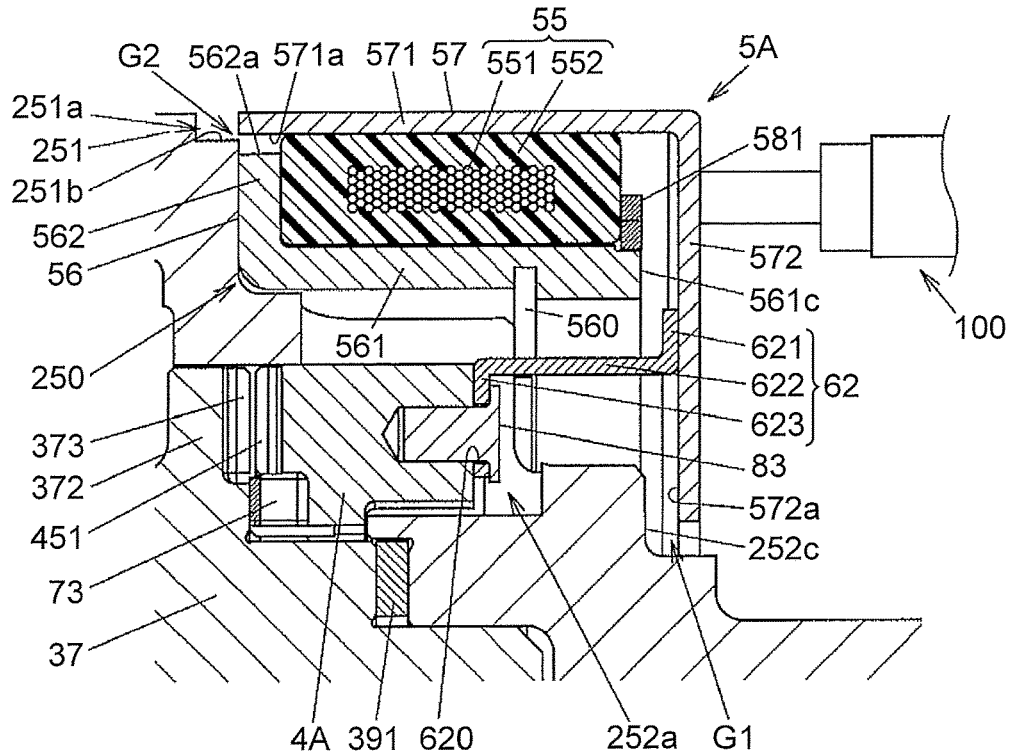
FIG. 8A is a cross-sectional view in which a part of the differential according to the second embodiment is enlarged, and shows a state where an intermittent member is at an uncoupled position.
Figure 8B:
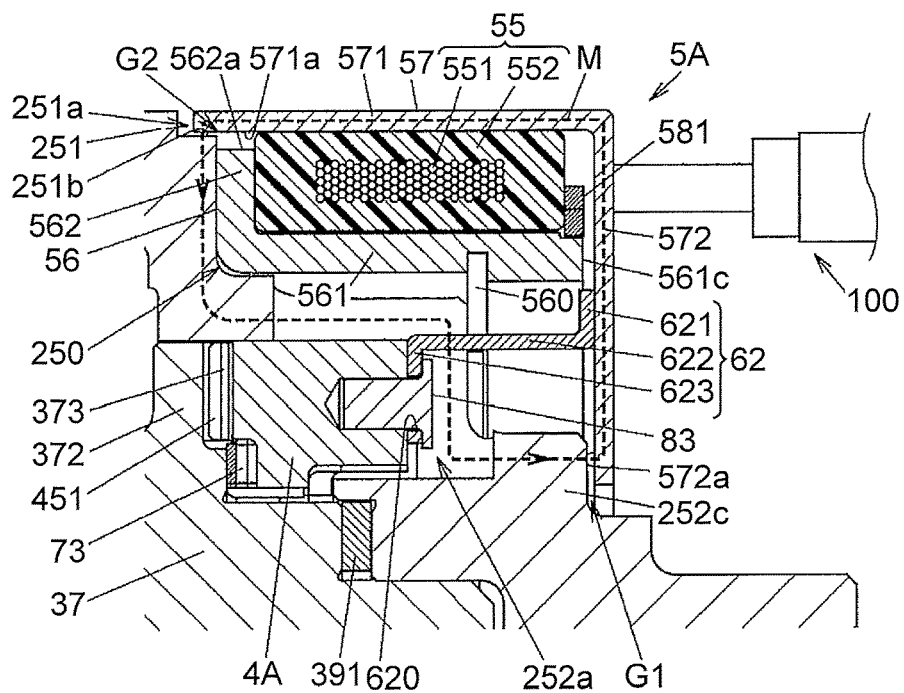
FIG. 8B is a cross-sectional view in which the part of the differential according to the second embodiment is enlarged, and shows a state where the intermittent member is at a coupled position.
Figure 9:
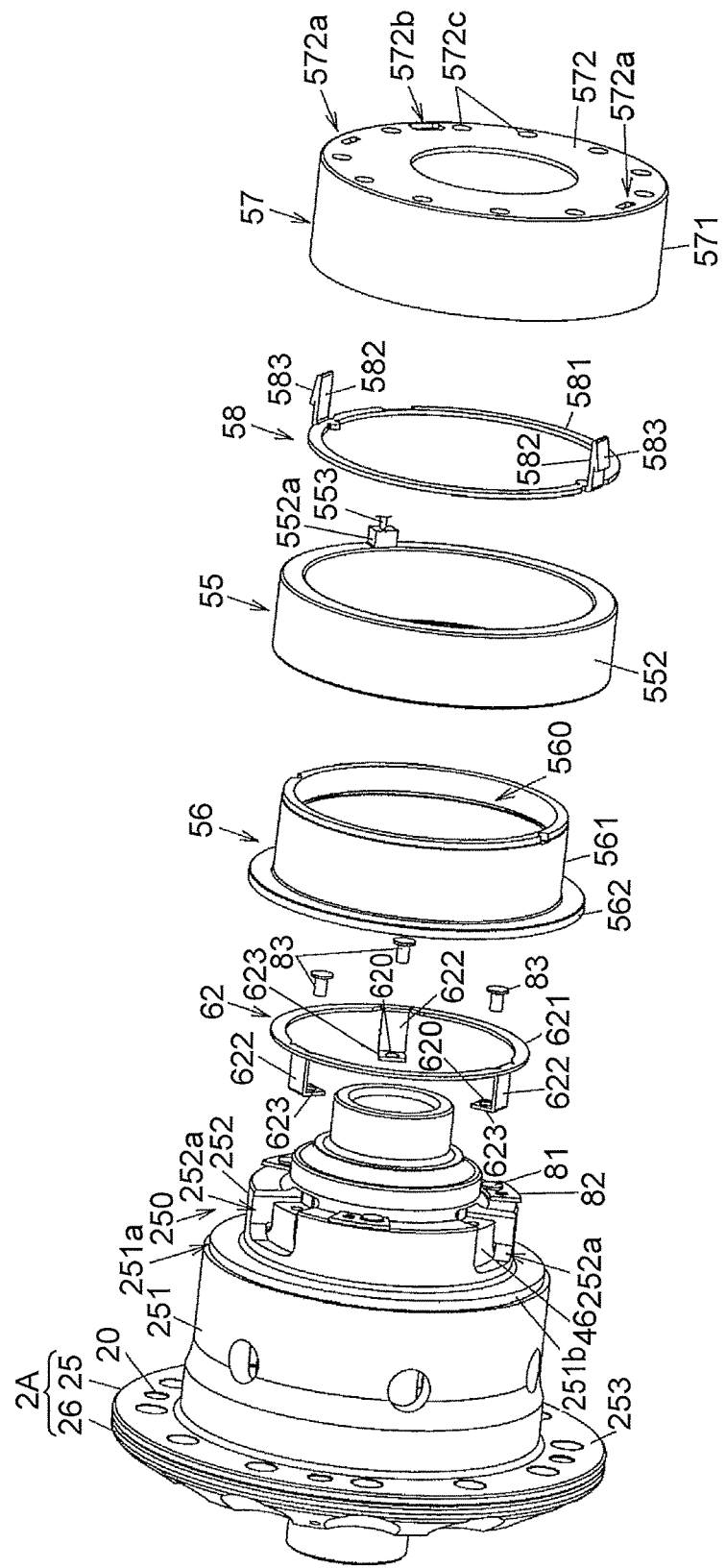
FIG. 9 is an exploded perspective view of the differential according to the second embodiment.
Figure 10:
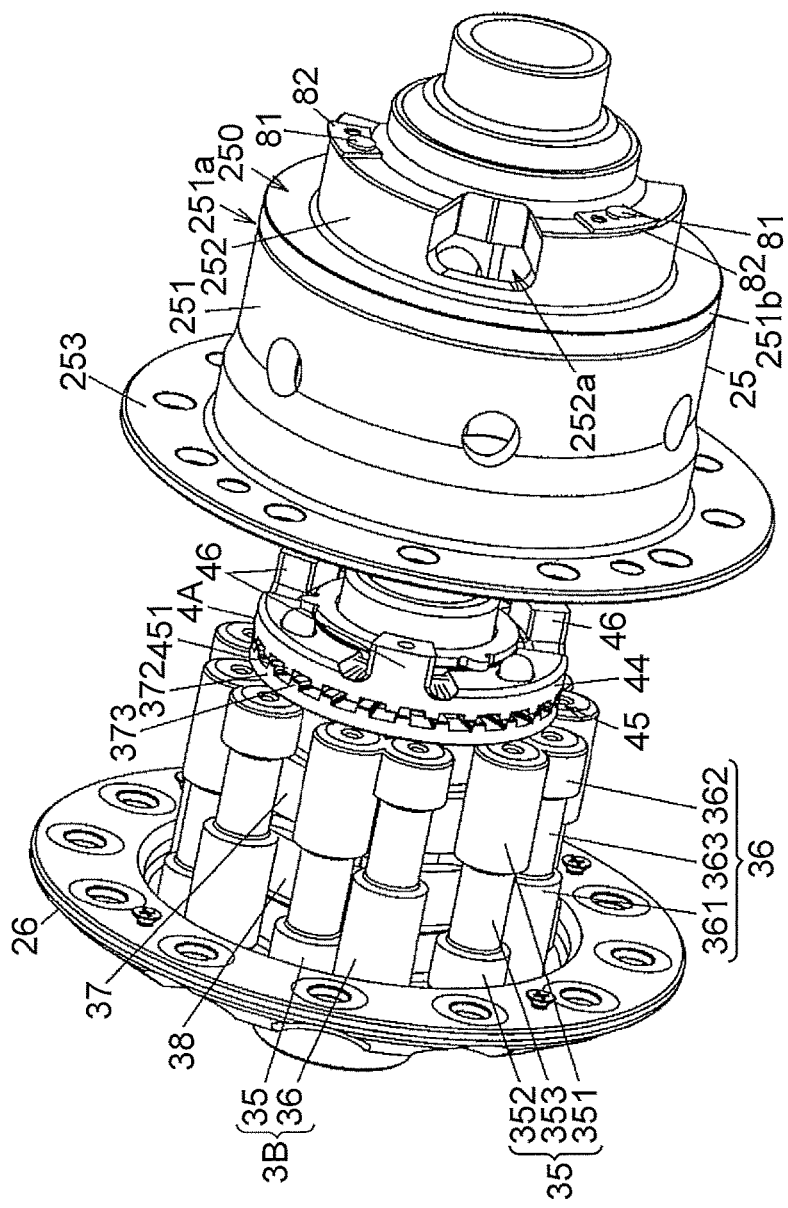
FIG. 10 is an exploded perspective view of a differential case and an internal structure thereof in the differential according to the second embodiment.

The intermittent member 4A can move in the axial direction between a coupled position where the differential case 2A and the first side gear 37 are coupled in the manner to inhibit the relative rotation and an uncoupled position where the relative rotation of the differential case 2A and the first side gear 37 is permitted. FIG. 8A shows a state where the intermittent member 4A is at the uncoupled position, and FIG. 8B shows a state where the intermittent member 4A is at the coupled position.

When the intermittent member 4A is at the coupled position, the differential motion of the differential case 2A and the first side gear 37 is restricted. Accordingly, the first pinion gear 35 and the second pinion gear 36 cannot rotate, and the differential motion of the differential case 2A and the second side gear 38 is also restricted. The intermittent member 4A is urged toward the uncoupled position by the wave washer 73 that is disposed between the intermittent member 4A and the first side gear 37.

The actuator 5A includes: an annular electromagnet 55 that has a coil 551 generating the magnetic flux when being energized and a resin member 552 covering the coil 551; a coil housing 56 that holds the electromagnet 55; a plunger 57 that moves with the intermittent member 4A in the axial direction; and a detent member 58 that restricts axial movement and rotation of the coil housing 56 relative to the differential carrier 9A. A cross-sectional shape of the electromagnet 55 along the rotational axis O is rectangular, and the coil 551 is held in the coil housing 56 via the resin member 552.

By using the magnetic force that is generated by the energization of the coil 551, the plunger 57 makes the intermittent member 4A move in such a direction that the meshing section 45 meshes with the meshing teeth 373 of the first side gear 37. The meshing section 45 of the intermittent member 4A meshes with the meshing teeth 373 of the meshing section 45 by the moving force of the actuator 5A that is transmitted via the intervening member 62.

The coil 551 of the electromagnet 55 is supplied with the excitation current from the unillustrated controller via the electric wire 553 that is led out of a boss section 552a provided in the resin member 552. The actuator 5A is actuated when the excitation current is supplied to the coil 551. The coil housing 56 integrally includes: a cylindrical section 561 that covers an inner peripheral surface of the resin member 552 of the electromagnet 55 from inside; and a wall section 562 in a shape of the ring-shaped plate that extends outward from one axial end of the cylindrical section 561 and covers a part of one axial end surface of the resin member 552. The cylindrical section 561 of the coil housing 56 is formed such that an inner diameter thereof is slightly larger than an outer diameter of a portion of the differential case 2A that opposes an inner peripheral surface of this cylindrical section 561.

The detent member 58 is fixed to an end of the cylindrical section 561 of the coil housing 56 on an opposite side from the wall section 562. The detent member 58 integrally includes: an annular section 581 that is disposed on an outer periphery of the cylindrical section 561 of the coil housing 56; paired projected sections 582 that are projected in the axial direction from two positions in the annular section 581 in the peripheral direction; and a folded section 583 that is formed by folding a tip of each of the projected sections 582 at an acute angle. The annular section 581 is fixed to an outer peripheral surface of the cylindrical section 561 of the coil housing 56 by welding, for example.

An inner peripheral surface of the cylindrical section 561 of the coil housing 56 is formed with an annular recessed section 560, to which plural (three in this embodiment) plates 82 are fitted, and each of the plates 82 is formed of a non-magnetic body that is fixed to the differential case 2A by a press-fit pin 81. Because the plates 82 are fitted to the annular recessed section 560, the axial movement of the coil housing 56 relative to the differential case 2A is restricted. The annular recessed section 560 is formed such that width thereof in the axial direction is larger than thickness of the plate 82, so as to prevent generation of rotational resistance between the coil housing 56 and the differential case 2A during the rotation of the differential case 2A.

The projected sections 582 of the detent member 58 are respectively locked by locking sections 901 that are provided in the differential carrier 9A, and the rotation of the detent member 58 is thereby stopped. The differential carrier 9A is provided with the two locking sections 901 that respectively lock the projected sections 582, and one of the locking sections 901 is shown in FIG. 7. The plunger 57 is retained by the detent member 58 through the folded section 583, and the rotation thereof relative to the differential carrier 9A is stopped by the projected sections 582.

The plunger 57 is formed of a soft magnetic metal such as the low-carbon steel and integrally includes: an outer ring section 571 in an annular shape that is disposed on an outer periphery of the electromagnet 55; and a lateral plate section 572 that opposes the electromagnet 55 in the axial direction. The outer ring section 571 has a cylindrical shape that covers the electromagnet 55 from the outer peripheral side. The lateral plate section 572 is projected inward from one axial end of the outer ring section 571. An inner peripheral surface of the outer ring section 571 is in contact with an outer peripheral surface of the resin member 552, and the plunger 57 is thereby supported by the electromagnet 55.

The lateral plate section 572 is formed with: two insertion holes 572a, through which the projected sections 582 of the detent member 58 are respectively inserted; a through hole 572b that is penetrated by the boss section 552a of the electromagnet 55; and plural (ten in the example shown in FIG. 9) oil holes 572c, through which the lubricant flows. One end of the intervening member 62 abuts the lateral plate section 572.

The intervening member 62 is formed of a non-magnetic metal such as the austenitic stainless steel and integrally includes: a ring section 621 that abuts the lateral plate section 572 of the plunger 57; three projected shafts 622, each of which extends from the ring section 621 in the axial direction; and fixed sections 623 that are projected inward from tips of the projected shafts 622 and are fixed to the intermittent member 4A. The ring section 621 slides on the lateral plate section 572 of the plunger 57, and the intervening member 62 thereby rotates with the differential case 2A. The fixed sections 623 are each formed with an insertion hole 620, through which a press-fit pin 83 is inserted to fix the fixed section 623 to the intermittent member 4A.

The differential case 2A includes a first case member 25 and a second case member 26 that are fixed to each other by the plural screws 20. The first case member 25 is supported by the bearing 93 to be rotatable relative to the differential carrier 9A, and the second case member 26 is supported by the bearing 94 to be rotatable relative to the differential carrier 9A.

The first case member 25 integrally includes: a cylindrical section 251 that holds the plural pinion gear pairs 3B in a manner to allow rotation thereof; a bottom section 252 that extends inward from one axial end of the cylindrical section 251; and a flange section 253 that abuts the second case member 26. A corner section between the cylindrical section 251 and the bottom section 252 is formed with an annular recessed section 250 in which the electromagnet 55 and the coil housing 56 are disposed.

The first side gear 37 and the second side gear 38 are disposed in the cylindrical section 251. In addition, the first case member 25 is formed of, for example, the carbon steel such as S45C, the chromium molybdenum steel such as SCM445, or the low-carbon steel such as S10C.

The bottom section 252 of the first case member 25 is formed with plural insertion holes 252a, in each of which the projected shaft 622 and the fixed section 623 of the intervening member 62 are inserted. The insertion holes 252a penetrate the bottom section 252 in the axial direction. Protruding sections 46 (will be described below) of the intermittent member 4A are respectively inserted in the insertion holes 252a. The protruding sections 46 are respectively inserted in the insertion holes 252a, and the relative rotation of the intermittent member 4A to the differential case 2A is thereby restricted. In this embodiment, the three insertion holes 252a are formed at equally spaced intervals along the peripheral direction of the bottom section 252.

When the excitation current is supplied to the electromagnet 55, the magnetic flux is generated in the magnetic path M shown in FIG. 8B, and the plunger 57 moves in the axial direction. Due to this axial movement of the plunger 57, the intermittent member 4A is pressed via the intervening member 62 and moves from the uncoupled position to the coupled position.

Figure 11B:
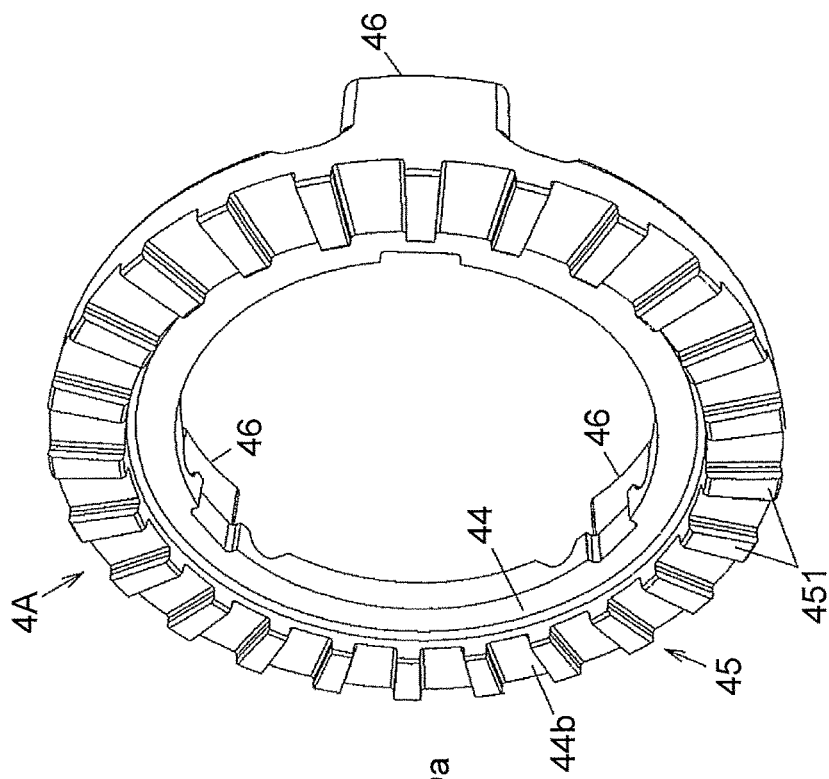
FIG. 11B is a perspective view in which the intermittent member of the differential according to the second embodiment is seen from the other surface.
Figure 11A:
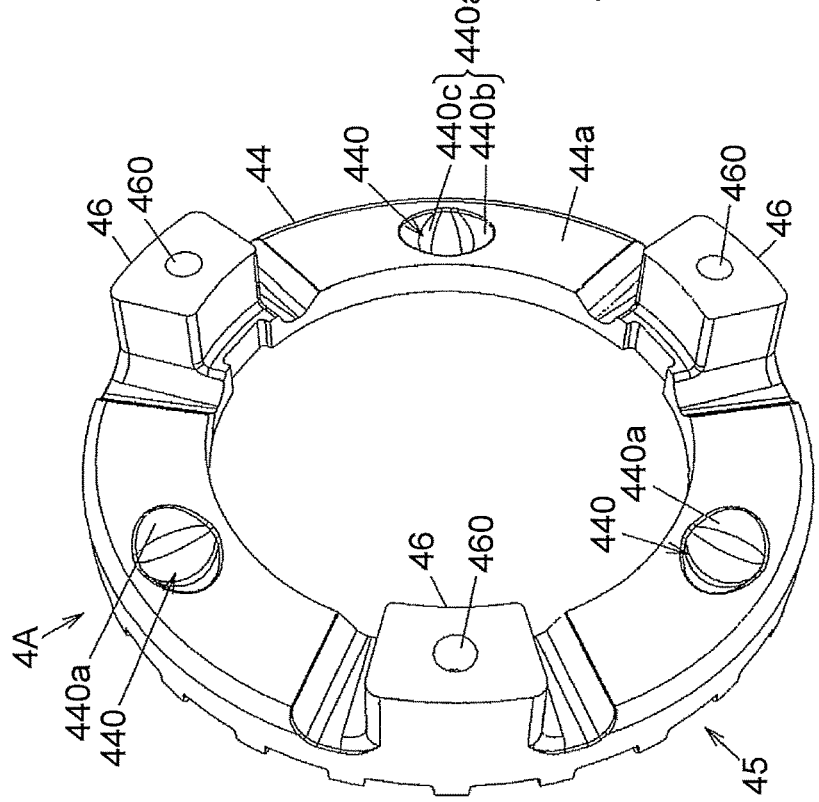
FIG. 11A is a perspective view in which the intermittent member of the differential according to the second embodiment is seen from one surface.

As shown in FIG. 11A and FIG. 11B, the intermittent member 4A integrally includes: a disc section 44 in a shape of the ring-shaped plate that is formed with plural (three) bowl-shaped recessed section 440 on one axial end surface 44a; the meshing section 45 that is formed on the other axial end surface 44b of the disc section 44 opposing the first side gear 37 in the axial direction; and the protruding sections 46 in trapezoidal column shapes, each of which is projected in the axial direction from the one axial end surface 44a of the disc section 44.

The one axial end surface 44a of the disc section 44 opposes the bottom section 252 of the first case member 25 in the axial direction. The protruding sections 46 are partially inserted in the insertion holes 252a that are formed in the bottom section 252 of the first case member 25, respectively. The protruding sections 46 are respectively inserted in the insertion holes 252a of the first case member 25, and the intermittent member 4A can thereby move relative to the differential case 2A in the axial direction but cannot make the relative rotation thereto. Width of the insertion hole 252a in the peripheral direction is greater than width of the protruding section 46 of the intermittent member 4A in the peripheral direction, and the differential case 2A and the intermittent member 4A can rotate relative to each other within a specified angular range that corresponds to a difference between the width of the insertion hole 252a in the peripheral direction and the width of the protruding section 46 of the intermittent member 4A in the peripheral direction.

The meshing section 45 of the intermittent member 4A is formed with plural meshing teeth 451 that are projected in the axial direction. The plural meshing teeth 451 are formed in a part on an outer peripheral side of the other axial end surface 44b of the disc section 44. The other axial end surface 44b on the inside of the meshing section 45 is formed as a flat receiving surface that is abutted by the wave washer 73 and receives the urging force against the uncoupled position.

When the intermittent member 4A is pressed by the plunger 57 via the intervening member 62 and thereby moves to the coupled position, the plural meshing teeth 451 of the meshing section 45 respectively mesh with the plural meshing teeth 373 of the first side gear 37. That is, when the intermittent member 4A moves to the first side gear 37 side, the intermittent member 4A and the first side gear 37 are coupled in the manner to inhibit the relative rotation by meshing of the plural meshing teeth 451, 373. On the other hand, when the intermittent member 4A moves to the uncoupled position by the urging force of the wave washer 73, the meshing teeth 451, 373 no longer mesh with each other, and the intermittent member 4A and the first side gear 37 can thereby make the relative rotation.

A tip surface of each of the protruding sections 46 is formed with a press-fit hole 460, to which the press-fit pin 83 for fixing the intermittent member 4A to the intervening member 62 is press-fitted. When the press-fit pin 83, which is inserted through the insertion hole 620 formed in the fixed section 623 of the intervening member 62 is press-fitted to the press-fit hole 460, the intermittent member 4A is fixed to the intervening member 62 in a manner to integrally move therewith in the axial direction. Note that, instead of the press-fit pin 83, the fixed section 623 of the intervening member 62 and the protruding section 46 of the intermittent member 4A may be fastened by a bolt.

Depth of the bowl-shaped recessed section 440 in the axial direction is the greatest at a center in the peripheral direction, and the depth thereof in the axial direction is gradually reduced toward an end in the peripheral direction. An inner surface 440a of this bowl-shaped recessed section 440 is formed as a cam surface on which cam thrust in the axial direction is generated by the relative rotation to the first case member 25. As shown in FIG. 7, the bottom section 252 of the first case member 25 is formed with three recessed sections 252b (one of these recessed sections 252b is shown in FIG. 7), each of which is recessed in the axial direction, and a spherical body 84 that is disposed in each of these recessed sections 252b abuts the inner surface 440a of the bowl-shaped recessed section 440. A diameter of the recessed section 252b is substantially equal to a spherical diameter of the spherical body 84, and the spherical body 84 cannot roll in the recessed sections 252b.

The intermittent member 4A is formed with the inner surfaces 440a of the bowl-shaped recessed sections 440 over an angular range that is larger than a specified angular range where the differential case 2A and the intermittent member 4A can make the relative rotation. Then, when the intermittent member 4A rotates relative to the differential case 2A, the spherical body 84 abuts each of the inner surfaces 440a of the bowl-shaped recessed sections 440, and the cam thrust that presses the intermittent member 4A to the annular wall section 372 side of the first side gear 37 is thereby generated. In this way, the meshing section 45 of the intermittent member 4A and the meshing teeth 373 of the first side gear 37 reliably mesh with each other.

As shown in FIGS. 8A and 8B, an axial end surface 252c of the bottom section 252 of the first case member 25 opposes a part on the inner diameter side of the lateral plate section 572 of the plunger 57. The first air gap G1 is formed between an opposing surface 572a of the lateral plate section 572 that opposes this axial end surface 252c and the axial end surface 252c. A distance between the lateral plate section 572 of the plunger 57 and the axial end surface 252c of the first case member 25 is shorter than a distance between the lateral plate section 572 of the plunger 57 and an axial end surface 561c of the cylindrical section 561 of the coil housing 56. That is, the cylindrical section 561 of the coil housing 56 and the plunger 57 are spaced apart from each other with a clearance larger than the first air gap G1.

Axial length of the outer ring section 571 of the plunger 57 is longer than axial length of the coil housing 56. At an end on an opposite side from the lateral plate section 572 of the plunger 57, an inner peripheral surface 571a of the outer ring section 571 opposes an outer peripheral surface 562a of the wall section 562 of the coil housing 56 in the radial direction. When the plunger 57 moves in the axial direction by the magnetic force of the electromagnet 55, the inner peripheral surface 571a of the outer ring section 571 communicates with the annular recessed section 250 and opposes a bottom surface 251b of an annular groove 251a, which is formed in the first case member 25, in the radial direction. This bottom surface 251b is a part of the outer peripheral surface of the first case member 25. Just as described, the second air gap G2 is formed between the outer peripheral surface of the first case member 25 and an inner peripheral surface of the plunger 57 with a specified distance in the radial direction.

A distance between the outer ring section 571 of the plunger 57 and the outer peripheral surface 562a of the wall section 562 of the coil housing 56 is longer than a distance between the outer ring section 571 of the plunger 57 and the bottom surface 251b of the annular groove 251a. That is, the wall section 562 of the coil housing 56 and the plunger 57 are spaced apart each other with a clearance larger than the second air gap G2. In this way, the magnetic flux, which is generated by the energization of the coil 551, mainly passes through the plunger 57 and the first case member 25. The plunger 57 is supported by the resin member 552 of the electromagnet 55 in the radial direction, and the second air gap G2 is thereby maintained.

The first case member 25 and the plunger 57 constitute the magnetic path M of the magnetic flux of the coil 551 and can move relative to each other in the axial direction via the first and second air gaps G1, G2. In FIG. 8B, the direction of the magnetic flux in the magnetic path M is indicated by an arrow. The magnetic flux of the coil 551 passes through the first and second air gaps G1, G2. More specifically, when the coil 551 is energized, the magnetic flux is introduced from one of the first and second air gaps G1, G2 (the first air gap G1 in this embodiment) to the plunger 57, and the magnetic flux is led out of the plunger 57 to the other air gap (the second air gap G2 in this embodiment). Note that the direction of the magnetic flux in the magnetic path M is determined in accordance with the direction of the current flowing through the coil 551.

(Operation of the Differential 1A)

By the actuation and the non-actuation of the actuator 5A, the differential 1A is switched between the coupled state where the differential case 2A and the first side gear 37 are coupled by the intermittent member 4A in the manner to inhibit the relative rotation and the uncoupled state where the differential case 2A and the first side gear 37 can make the relative rotation.

During the non-actuation of the actuator 5A when the excitation current is not supplied to the coil 551 of the electromagnet 55, the intermittent member 4A separates from the annular wall section 372 of the first side gear 37 by the resilience of the wave washer 73, and meshing between the meshing section 45 and the second meshing teeth 373 is canceled. During this non-actuation of the actuator 5A, the drive power, which is received by the first pinion gear 35 and the second pinion gear 36 from the differential case 2A, is output from the first and second side gears 37, 38 while the differential motion thereof is permitted.

On the other hand, when the excitation current is supplied to the coil 551 of the electromagnet 55, the magnetic flux is generated in the magnetic path M, which is indicated by a broken line in FIG. 8B. Then, the plunger 57 moves in the axial direction by the magnetic force of the electromagnet 55 in the manner to reduce the second air gap G2. In this way, the intermittent member 4A is pressed to the bottom section 222 side of the second case member 22, and the meshing section 45 of the intermittent member 4A meshes with the meshing teeth 373 of the first side gear 37. Just as described, the intermittent member 4A can move in the axial direction between the coupled position where the meshing teeth 451 mesh with the meshing teeth 373 of the first side gear 37 and the uncoupled position where the meshing teeth 451 do not mesh with the meshing teeth 373 of the first side gear 37.

When the meshing teeth 451 mesh with the meshing teeth 373 of the first side gear 37, the differential 1A is brought into a differential-lock state where differential rotation between the first side gear 37 and the second side gear 38 is restricted.

Similar action and similar effects to those of the first embodiment can be obtained by the second embodiment that has been described so far.

Third Embodiment

Next, a description will be made on a third embodiment of the disclosure. In the third embodiment, the plunger 57 of the differential 1A according to the second embodiment and a support structure thereof are modified. A description will hereinafter be centered on different portions of the third embodiment from the second embodiment with reference to FIG. 12.

Figure 12:
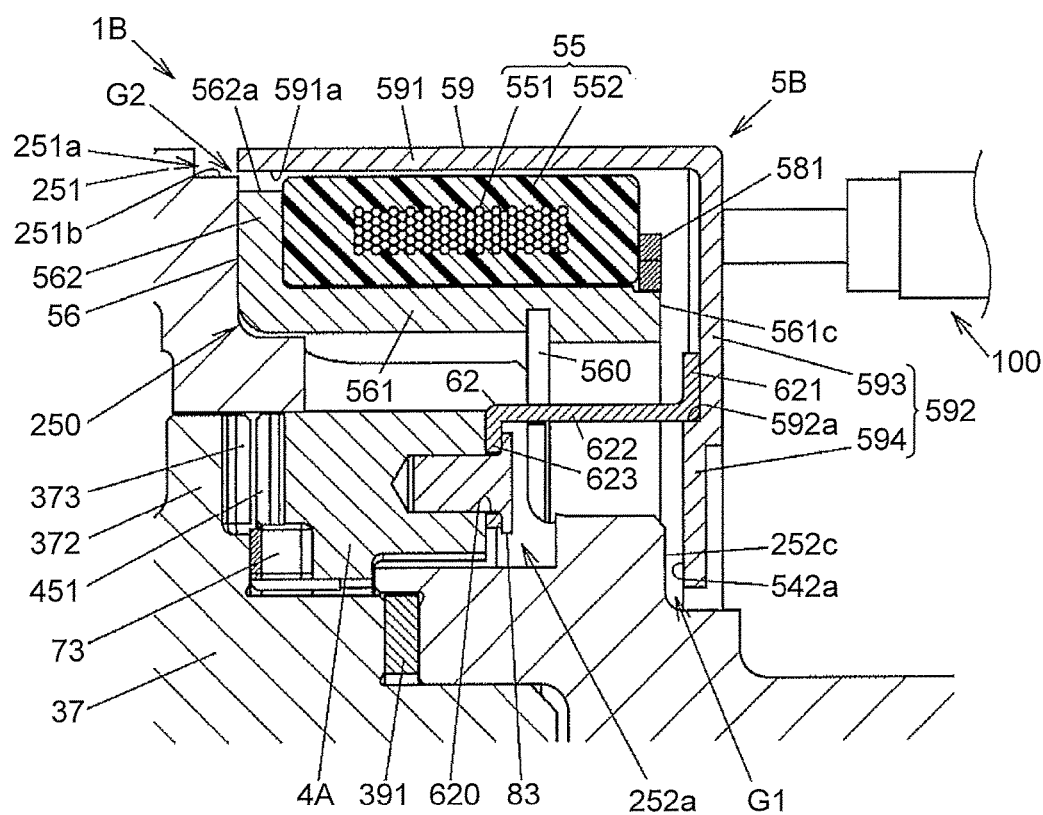
FIG. 12 is a partial cross-sectional view in which a portion of a differential according to a third embodiment is enlarged.
Figure 13:
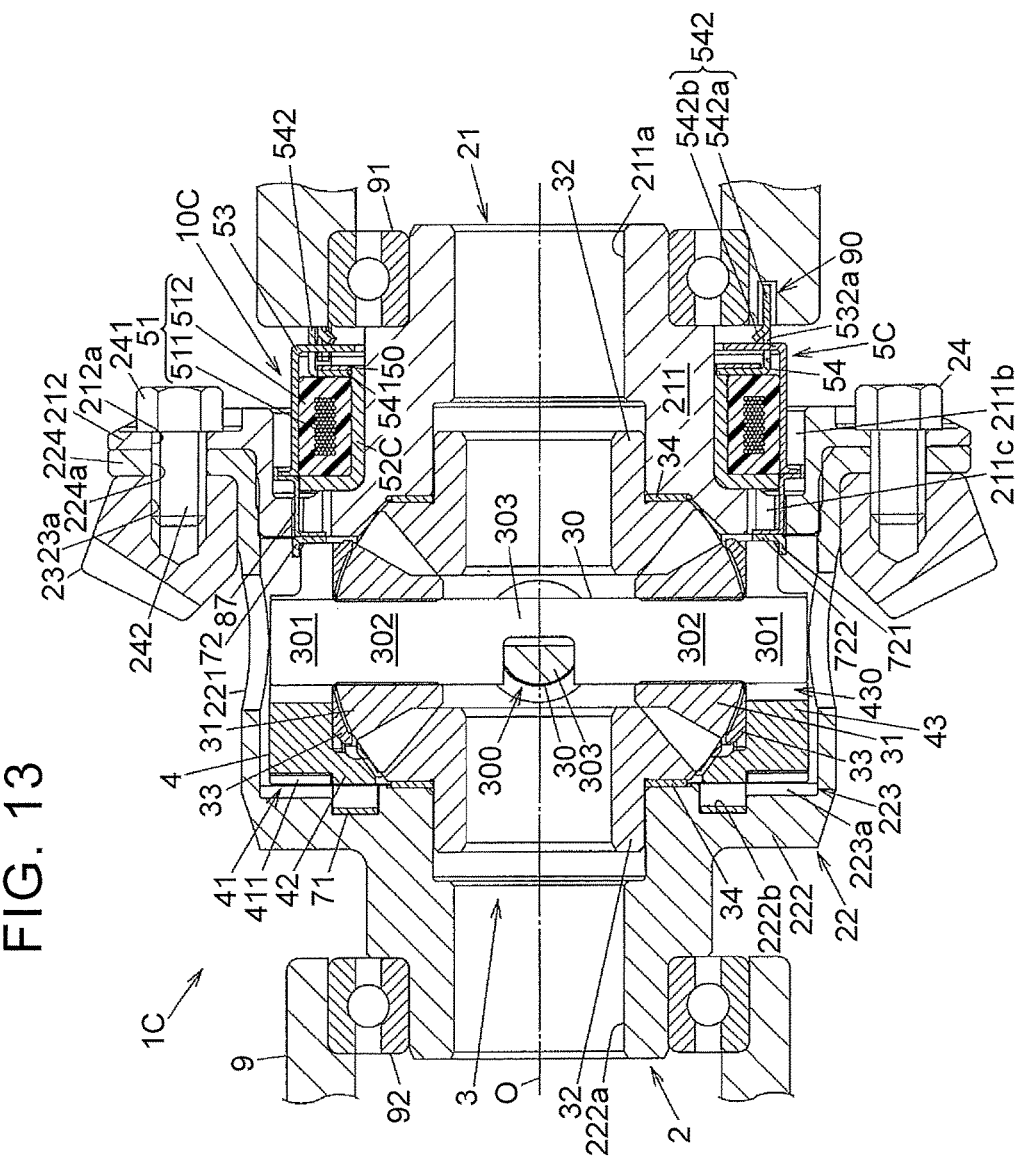
FIG. 13 is a cross-sectional view of a configuration example of a differential according to a fourth embodiment of the disclosure.

FIG. 12 is a partial cross-sectional view in which a portion of a differential 1B according to the third embodiment is enlarged. In FIG. 12, components that are in common with the second embodiment are denoted by the same reference numerals and descriptions thereon will not be made. This differential 1B is configured in a similar manner to the differential of the second embodiment except for a portion shown in FIG. 12.

An actuator 5B according to this embodiment has a plunger 59 that moves in the axial direction by the magnetic force of the electromagnet 55. The plunger 59 is formed of a soft magnetic body and integrally has: an outer ring section 591 in a cylindrical shape that is disposed on the outer periphery of the electromagnet 55; and an annular lateral plate section 592 that extends inward from one end of the outer ring section 591. The lateral plate section 592 has: a first annular section 593 that opposes the electromagnet 55 and the cylindrical section 561 of the coil housing 56 in the axial direction and, against which the ring section 621 of the intervening member 62 abuts; a second annular section 594 that has an opposing surface 594c opposing the axial end surface 252c of the bottom section 252 of the first case member 25 on an inner diameter side of the first annular section 593.

The lateral plate section 592 is bent such that the second annular section 594 comes closer to the first case member 25 side than the first annular section 593, and a stepped surface 592a is formed between the first annular section 593 and the second annular section 594. This stepped surface 592a opposes an inner peripheral surface of the ring section 621 in the intervening member 62. When the stepped surface 592a of the lateral plate section 592 is engaged with the ring section 621 of the intervening member 62, radial movement of the plunger 59 relative to the first case member 25 is restricted. That is, in the second embodiment, the inner peripheral surface of the outer ring section 571 is in contact with the outer peripheral surface of the resin member 552, and the plunger 57 is thereby supported by the electromagnet 55. In this embodiment, the plunger 59 is supported by the intervening member 62 in the radial direction.

As described above, the intervening member 62 is fixed to the intermittent member 4A by the press-fit pin 83, and the radial movement of the intermittent member 4A relative to the first case member 25 is restricted when the protruding section 46 comes in contact with a peripheral surface on an outer diameter side of the insertion hole 252a. In this way, the radial movement of the intervening member 62 relative to the first case member 25 is restricted.

An outer diameter of the electromagnet 55 is set in such a dimension that a slight gap is formed between the outer peripheral surface of the resin member 552 and an inner peripheral surface of the outer ring section 591 of the plunger 59. In this way, wear of the outer peripheral surface of the resin member 552 is prevented when the plunger 59 moves in the axial direction. The plunger 59 is supported by the intervening member 62 in the radial direction, and the second air gap G2 is thereby maintained.

Similar action and similar effects to those of the first embodiment can also be obtained by the third embodiment that has been described so far.

Fourth Embodiment

Next, a description will be made on an embodiment of the disclosure with reference to FIG. 13 to FIG. 17.

This differential 1C is used to permit the differential motion of the paired output shafts and distribute the drive power of the drive source, such as the engine of the vehicle, thereto. More specifically, the differential 1C according to this embodiment is mounted on the four-wheel-drive vehicle that includes: the right and left pair of the primary drive wheels (for example, the front wheels), to which the drive power of the drive source is constantly transmitted; and the right and left pair of the auxiliary drive wheels (for example, the rear wheels), to which the drive power of the drive source is transmitted in accordance with the travel state, and is used as the differential device that distributes the drive power to the right and left wheels of the auxiliary drive wheels. When the drive power is transmitted only to the primary drive wheels, the vehicle is in a two-wheel-drive state. When the drive power is transmitted to the primary drive wheels and the auxiliary drive wheels, the vehicle is in the four-wheel-drive state. In the four-wheel-drive state, the differential 1C distributes the received drive power to the right and left driveshafts on the auxiliary drive wheel side.

The differential 1C includes: the differential case 2 that is rotatably supported by the differential carrier 9 fixed to a vehicle body via the bearings 91, 92; the differential mechanism 3 accommodated in the differential case 2; the intermittent member 4 that intermittently transmits the drive power between the differential case 2 and the pinion shaft 30 of the differential mechanism 3; an actuator 5C that makes the intermittent member 4 move in the axial direction; and the wave washer 71 as the urging member that urges the intermittent member 4 to the actuator 5C side. Of these, the intermittent member 4 and the actuator 5C constitute an interrupter 10C that interrupts the transmission of the drive power between the pinion shaft 30 as the first rotary member and the differential case 2 as the second rotary member.

The differential mechanism 3 has: the pinion shaft 30, to which the drive power is transmitted from the differential case 2 via the intermittent member 4; the plural (four) pinion gears 31 that are rotatably supported around the rotational axis O of the differential case 2; and the side gears 32 as the paired output members. During non-actuation of the actuator 5C, the pinion shaft 30 can rotate relative to the differential case 2 about the common rotational axis O. The differential mechanism 3 outputs the drive power, which is transmitted to the pinion shaft 30, from the side gears 32 while permitting the differential motion thereof. In the following description, the axial direction is the direction parallel to the rotational axis O.

In this embodiment, the differential mechanism 3 has the pinion shafts 30. Of the four pinion gears 31, two of the pinion gears 31 are pivotally supported on one of the pinion shafts 30, and the other two pinion gears 31 are pivotally supported on the other pinion shaft 30. The pinion gears 31 and the side gears 32 are formed as the bevel gears and mesh with each other while the gear shafts intersect with each other at the right angles. The right and left driveshafts are respectively coupled to the side gears 32 in the manner to inhibit the relative rotation. Note that, although the plural gear teeth are formed on each of the pinion gears 31 and the side gears 32, these gear teeth are not shown in FIG. 15.

Figure 15:
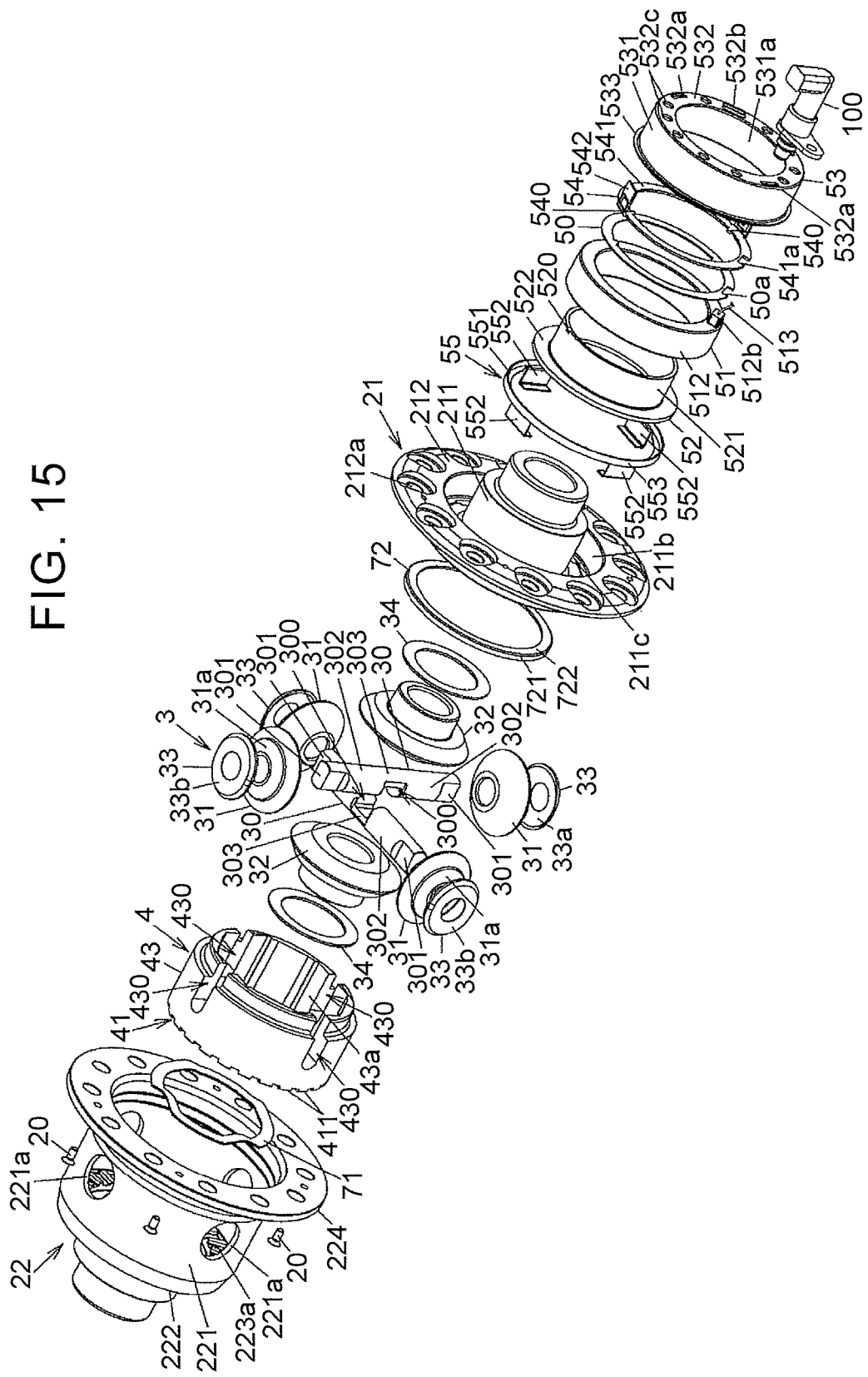
FIG. 15 is an exploded perspective view of the differential.
Figure 16:
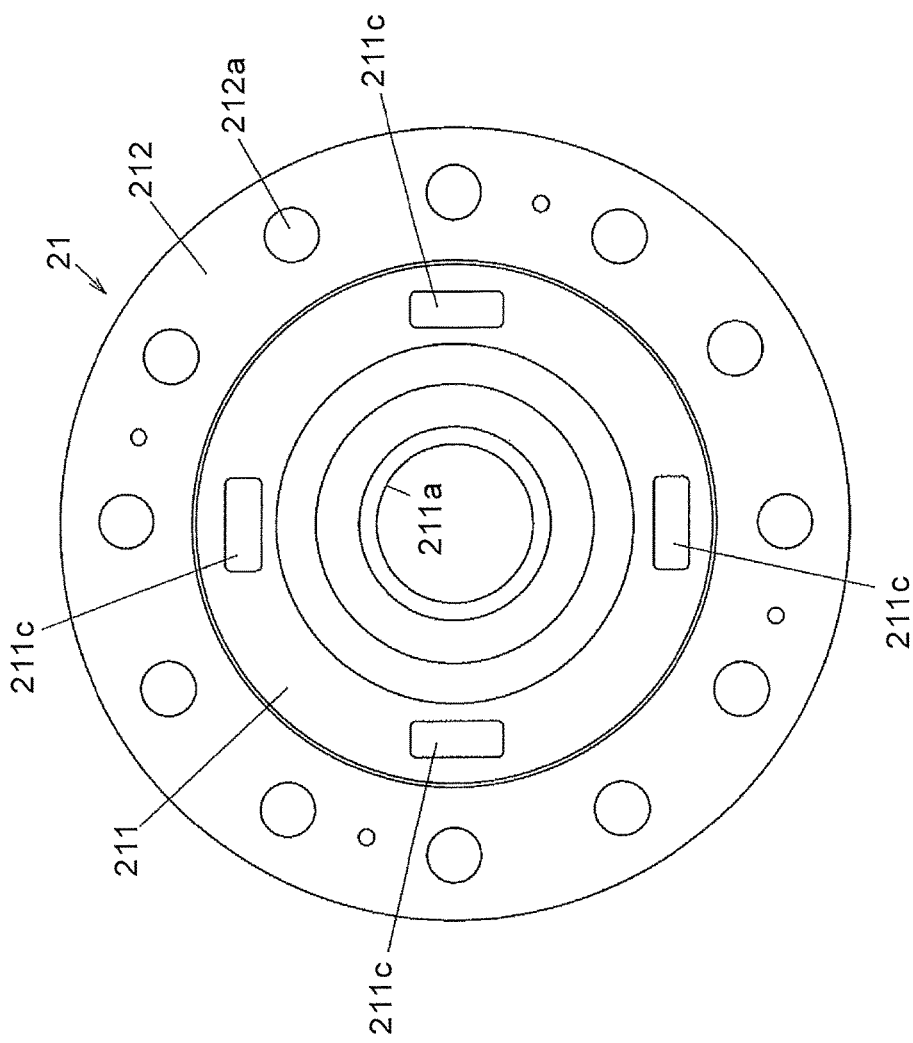
FIG. 16 is a plan view in which an inner surface of a first case member of a differential case is seen in the axial direction.

As shown in FIG. 15, each of the pinion shafts 30 integrally has: the engaged sections 301 engaged with the intermittent member 4; the pinion gear support sections 302 respectively inserted through the pinion gears 31; and the coupling section 303 that couples the pinion gear support sections 302, and is formed in the shaft shape as a whole. The engaged sections 301 are respectively provided at both of the ends of the pinion shaft 30, and the coupling section 303 is provided at the center of the pinion shaft 30 in the axial direction. Each of the pinion gear support sections 302 is provided between one of the engaged sections 301 and the coupling section 303 and pivotally supports the pinion gear 31.

The pinion shafts 30 mesh with each other at the centers thereof in the axial direction. More specifically, the coupling section 303 of the one pinion shaft 30 is fitted to the recessed section 300 that is formed between the pinion gear support sections 302 on the other pinion shaft 30, and the coupling section 303 of the other pinion shaft 30 is fitted to the recessed section 300 that is formed between the pinion gear support sections 302 on the one pinion shaft 30. The pinion shafts 30 intersect with each other at the right angles when seen along the rotational axis O of the differential case 2.

The intermittent member 4 has the cylindrical shape whose center axis matches the rotational axis O of the differential case 2, and is formed by forging the steel material. The intermittent member 4 can move relative to the pinion shafts 30 of the differential mechanism 3 in the center axis direction along the rotational axis O of the differential case 2 but is restricted from making the relative rotation thereto.

The intermittent member 4 integrally has: a first meshing section 41 that has plural meshing teeth 411 provided at an end in the center axis direction; a ring-shaped inner flange section 42 that is projected inward from the first meshing section 41; and a cylindrical section 43 that is formed with the engaging section 430, with which the pinion shaft 30 is engaged in the peripheral direction. The first meshing section 41 meshes with the second meshing section 223 (will be described below) that is provided in the differential case 2 in the peripheral direction. The axial end surface of the inner flange section 42 abuts the wave washer 71 and receives the urging force of the wave washer 71. The engaging section 430 is formed as the groove that penetrates the portion between the inner and outer peripheral surfaces of the cylindrical section 43 and extends in the center axis direction of the intermittent member 4.

The engaged section 301, which is provided at each of the ends of the pinion shaft 30, is engaged with the engaging section 430. When the engaged section 301 of the pinion shaft 30 is engaged with the engaging section 430 of the intermittent member 4, the intermittent member 4 can move relative to the pinion shaft 30 in the center axis direction along the rotational axis O but cannot make the relative rotation thereto. The plural pinion gears 31 can rotate (revolve) with the intermittent member 4 about the rotational axis O of the differential case 2. In this embodiment, because the engaged sections 301, which are provided at both of the ends of the pinion shafts 30, are engaged with the intermittent member 4, the cylindrical section 43 is formed with the four engaging sections 430.

The washer 33 is disposed between the back surface 31a of each of the pinion gears 31 and the inner peripheral surface 43a of the cylindrical section 43 of the intermittent member 4. An inner surface 33a of the washer 33 that opposes the back surface 31a of the pinion gear 31 has a partially spherical shape, and an outer surface 33b thereof that opposes the inner peripheral surface 43a of the cylindrical section 43 of the intermittent member 4 has a planar shape. When the pinion gear 31 rotates (revolves) about the pinion shaft 30, the back surface 31a of the pinion gears 31 slides on the inner surface 33a of the washer 33. When the intermittent member 4 moves in the center axis direction relative to the pinion shaft 30, the inner peripheral surface 43a of the cylindrical section 43 of the intermittent member 4 slides on the outer surface 33b of the washer 33. A portion of the inner peripheral surface 43a of the cylindrical section 43 that slides on the outer surface 33b of the washer 33 is formed in a planar shape.

The actuator 5C has: the annular electromagnet 51 that has the coil 511 generating the magnetic flux when being energized and the resin member 512 covering the coil 511; a yoke 52C that holds the electromagnet 51; the plunger 53 that moves with the intermittent member 4 in the axial direction; the detent member 54 that restricts axial movement and rotation of the yoke 52C relative to the differential carrier 9; and a support member 87 that is interposed between the intermittent member 4 and the plunger 53 to support the plunger 53, and transmits the moving force of the plunger 53 to the intermittent member 4.

The electromagnet 51, the yoke 52C, the plunger 53, and the detent member 54 are disposed outside the differential case 2. The cross-sectional shape of the electromagnet 51 along the rotational axis O is rectangular, and the coil 511 is held in the yoke 52C via the resin member 512. The electromagnet 51 is formed by molding the coil 511, which is formed by winding the enameled wire, for example, with the resin member 512.

By using a magnetic force that is generated by energization of the coil 511, the plunger 53 makes the intermittent member 4 move in such a direction that the first meshing section 41 meshes with the second meshing section 223 of the differential case 2. The first meshing section 41 of the intermittent member 4 meshes with the second meshing section 223 by the moving force of the actuator 5C that is transmitted via the support member 87.

The coil 511 of the electromagnet 51 is supplied with the excitation current from the unillustrated controller via the electric wire 513 that is led out of the boss section 512a provided in the resin member 512. The actuator 5C is actuated when the excitation current is supplied to the coil 511. The yoke 52C is an annular member with an L-shaped cross section and is formed of the soft magnetic metal such as the low-carbon steel. The yoke 52C integrally has: the cylindrical section 521 that covers the inner peripheral surface of the resin member 512 of the electromagnet 51 from inside; and the wall section 522 in the shape of the ring-shaped plate that extends from the one axial end of the cylindrical section 521 in the radial direction and covers the one axial end surface of the resin member 512. The cylindrical section 521 has a cylindrical shape with the rotational axis O being a center axis and is disposed between the differential case 2 and the resin member 512. The wall section 522 extends outward from the one end of the cylindrical section 521.

The cylindrical section 521 of the yoke 52C is formed such that the inner diameter thereof is slightly larger than the outer diameter of the portion of the differential case 2 that opposes the inner peripheral surface of this cylindrical section 521. In this way, the differential case 2 can freely rotate relative to the yoke 52C. The wall section 522 is formed such that the outer diameter thereof is smaller than the inner diameter of a ring section 871 (will be described below) of the support member 87.

The detent member 54 is fixed to the end of the cylindrical section 521 of the yoke 52C on the opposite side from the wall section 522. The detent member 54 is formed of the non-magnetic body such as the austenitic stainless steel and integrally has: the annular section 541 that is disposed on the outer periphery of the cylindrical section 521 of the yoke 52C; the projected sections 542 that are projected in the axial direction from the two positions in the annular section 541 in the peripheral direction; and paired engaged projections 540 that are provided in the annular section 541. The engaged projections 540 are respectively engaged with engaging recessed sections 520 that are formed in the cylindrical section 521 of the yoke 52C, and the rotation of the detent member 54 relative to the yoke 52C is thereby restricted. FIG. 15 shows one of the two engaging recessed sections 520 formed in the cylindrical section 521 of the yoke 52C.

The detent member 54 is retained in the cylindrical section 521 of the yoke 52C by a ring-shaped stopper ring 50. More specifically, the annular section 541 of the detent member 54 is held between the stopper ring 50 and the electromagnet 51 in the axial direction. In this way, the electromagnet 51 is positioned in the axial direction. The stopper ring 50 is fixed to the outer peripheral surface of the cylindrical section 521 of the yoke 52C by welding, for example.

The projected sections 542 are respectively fitted to the recessed sections 90 that are formed in the differential carrier 9, and the detent member 54 thereby stops rotation of the yoke 52C. In addition, the projected sections 542 are respectively inserted through the axial insertion holes 532a that are formed in the plunger 53, and thereby stop the rotation of the plunger 53 relative to the yoke 52C and the differential carrier 9. Each of the projected sections 542 has: the flat plate section 542a that is inserted through the insertion hole 532a of the plunger 53; and the locking projection 542b that is disposed on the recessed section 90 side of the differential carrier 9 from the insertion holes 532a and restricts the axial movement of the plunger 53 relative to the yoke 52C. In this embodiment, the locking projection 542b is formed by cutting and raising the part of the plate section 542a.

The plunger 53 is an annular member with an L-shaped cross section and is formed of the soft magnetic body such as the low-carbon steel. The plunger 53 integrally has: the outer ring section 531 in a cylindrical shape; the lateral plate section 532 that is projected inward from one axial end of the outer ring section 531; and the flange section 533 that is projected outward from the other axial end of the outer ring section 531. The outer ring section 531 of the plunger 53 is disposed on the outer peripheral side of the electromagnet 51 and holds the electromagnet 51 between the outer ring section 531 and the cylindrical section 521 of the yoke 52C. An inner diameter of the outer ring section 531 of the plunger 53 is larger than an outer diameter of the electromagnet 51 (an outer diameter of the resin member 512), and the inner peripheral surface of the outer ring section 531 opposes the outer peripheral surface of the electromagnet 51 (the outer peripheral surface of the resin member 512) via a gap.

The plunger 53 holds the electromagnet 51 between the lateral plate section 532 and the wall section 522 of the yoke 52C. The lateral plate section 532 of the plunger 53 is formed with: the two insertion holes 532a, through which the projected sections 542 of the detent member 54 are respectively inserted; the through hole 532b that is penetrated by the boss section 512a of the electromagnet 51; and plural (ten in the example shown in FIG. 15) oil holes 532c, through which the lubricant flows. Together with the yoke 52C, the plunger 53 constitutes the magnetic path of the magnetic flux that is generated by the energization of the electromagnet 51. The rotation of the electromagnet 51 relative to the yoke 52C is stopped when the boss section 512a penetrates the through hole 532b.

The support member 87 has the ring section 871 that abuts the flange section 533 of the plunger 53 in the axial direction; plural projected shafts 872, each of which extends from the ring section 871 in the axial direction; and a cylindrical section 873 that covers the outer peripheral side of the flange section 533 of the plunger 53. In this embodiment, the four projected shafts 872 are provided in the support member 87. The support member 87 is formed of a non-magnetic body and is formed by pressing a steel sheet made of austenitic stainless steel, for example. A tip (an opposite end from a base end on the ring section 871 side) of the projected shaft 872 is bent to an inner diameter side.

The washer 72 with an L-shaped cross section is disposed between the tip of the projected shaft 872 and the cylindrical section 43 of the intermittent member 4. The washer 72 has: the cylindrical tube section 721; and the disc section 722 that extends inward from the one axial end of the tube section 721. The tube section 721 is fitted onto the cylindrical section 43 of the intermittent member 4. The tip of the projected shafts 872 abuts the disc section 722 of the washer 72.

The differential case 2 has the first case member 21 in a disc shape and the second case member 22 in the bottomed cylindrical shape. The first case member 21 closes the opening of the second case member 22. The washer 34 in the annular plate shape is disposed between the side gears 32 in the differential mechanism 3 and each of the first case member 21 and the second case member 22. The lubricant (differential oil) that lubricates the differential mechanism 3 is introduced in the differential case 2.

Figure 17:
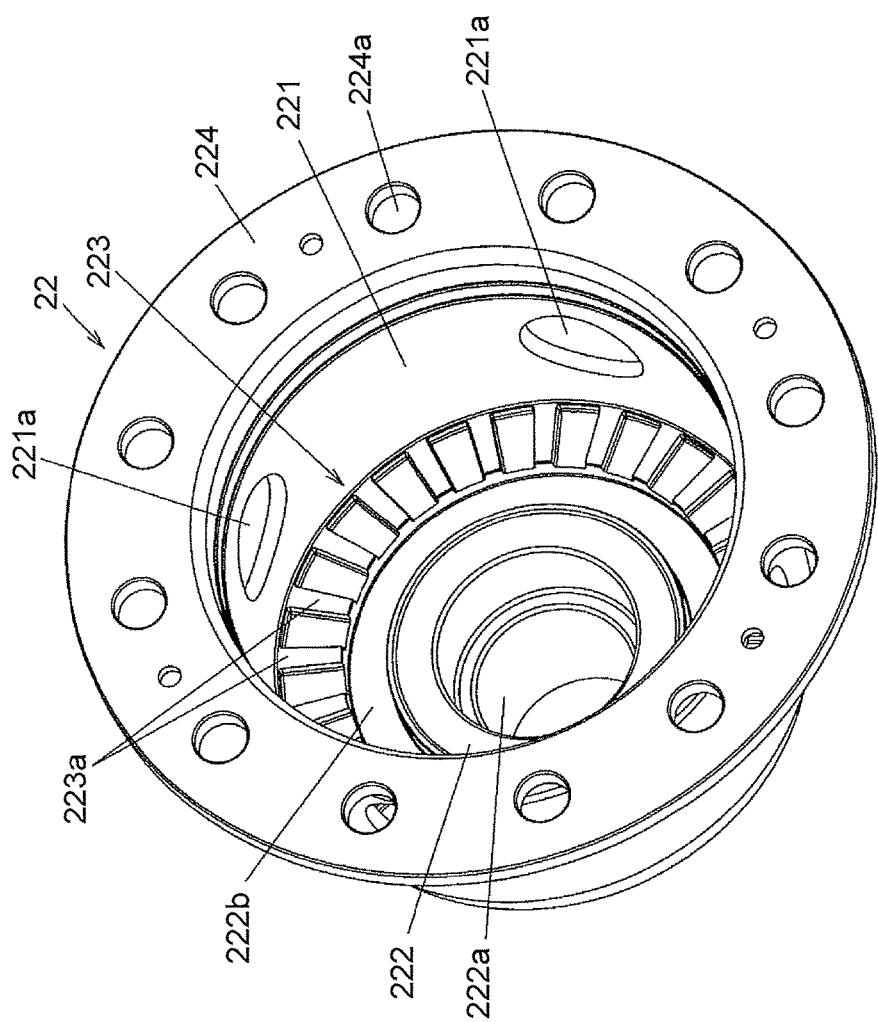
FIG. 17 is a perspective view of a second case member of the differential case.

As shown in FIG. 17, the second case member 22 integrally has: the cylindrical section 221 that accommodates the differential mechanism 3 and the intermittent member 4; the bottom section 222 that extends inward from the one axial end of the cylindrical section 221; the second meshing section 223 that meshes with the first meshing section 41 of the intermittent member 4; and the flange section 224 that extends outward from the other axial end of the cylindrical section 221. The cylindrical section 221 is formed with the plural oil holes 221a, through which the lubricant flows. The bottom section 222 is formed with: the shaft insertion hole 222a, in which the driveshaft coupled to one of the side gears 32 in the manner to inhibit the relative rotation thereto is inserted; and the annular groove 222b that accommodates the wave washer 71.

The second meshing section 223 includes plural meshing teeth 223a that are provided at equally spaced intervals along the peripheral direction, and is provided on the bottom section 222 side of the second case member 22. In this embodiment, the plural meshing teeth 223a are projected in the axial direction from the inner surface of the bottom section 222. The wave washer 71 urges the intermittent member 4 in the direction to separate from the bottom section 222 of the second case member 22.

The first case member 21 integrally has: the disc section 211 that opposes the bottom section 222 of the second case member 22 in the axial direction; and the flange section 212 that abuts the flange section 224 on the second case member 22 side. The flange section 212 of the first case member 21 and the flange section 224 of the second case member 22 are joined to each other by the plural screws 20. The disc section 211 is formed with the shaft insertion hole 211a, in which the driveshaft coupled to the other of the side gears 32 in the manner to inhibit the relative rotation thereto is inserted. The disc section 211 is also formed with: the annular groove 211b that is recessed in the axial direction from the outer surface thereof on the opposite side of the opposing surface to the bottom section 222 of the second case member 22; and the plural through holes 211c, each of which communicates with the annular groove 211b and penetrates the disc section 211 in the axial direction.

The electromagnet 51, the yoke 52C, and the support member 87 are partially accommodated in the annular groove 211b of the first case member 21. The ring section 871 and the cylindrical section 873 of the support member 87 are disposed in the annular groove 211b, and the plural projected shafts 872 thereof are respectively inserted through the plural through holes 211c of the first case member 21. An outer peripheral surface of the cylindrical section 873 is in contact with an inner surface 211h on the outer diameter side of the annular groove 211b of the first case member 21, and a radial position of the support member 87 relative to the first case member 21 is thereby determined. The cylindrical section 873 of the support member 87 is formed such that the outer diameter thereof is slightly smaller than a diameter of the inner surface 211h of the annular groove 211b. A specified gap is formed between the projected shafts 872 of the support member 87 and an inner surface 211g of the through holes 211c.

The differential case 2 receives the drive power from the ring gear 23 (see FIG. 13) that is fixed to the flange sections 212, 224 of the first and second case members 21, 22. The ring gear 23 is fixed to the outer periphery of the cylindrical section 221 on the flange section 224 side in the second case member 22. In this embodiment, the ring gear 23 is fixed to the differential case 2 so as to rotate integrally by the plural fastening bolts 24 that are respectively inserted through the plural bolt insertion holes 212a formed in the flange section 212 of the first case member 21 and the plural bolt insertion holes 224a formed in the flange section 224 of the second case member 22. The head 241 of each of the fastening bolts 24 abuts the flange section 212 of the first case member 21. The shaft 242 thereof formed with the male screw is inserted through the bolt insertion holes 212a, 224a and is screwed to the screw hole 23a of the ring gear 23.

The ring section 871 of the support member 87 abuts the flange section 533 of the plunger 53 and receives the moving force in the axial direction from the plunger 53. When the coil 511 of the electromagnet 51 is energized, the magnetic flux is generated in the magnetic path M, which is indicated by a broken line in FIG. 14B. Then, the plunger 53 presses the intermittent member 4 via the support member 87 and makes the intermittent member 4 move in the axial direction.

The support member 87 supports the plunger 53 in a manner to allow axial movement thereof and prohibit the rotation relative to the electromagnet 51 so as to maintain the radial gap between the outer ring section 531 of the plunger 53 and the electromagnet 51. More specifically, the flange section 533 of the plunger 53 is surrounded by the cylindrical section 873 of the support member 87, and the plunger 53 is thereby supported by support member 87 in the radial direction. In addition, during the rotation of the differential case 2, the support member 87 can move with the plunger 53 in the axial direction while the ring section 871 thereof slides on the flange section 533 of the plunger 53 to make relative rotation thereto. The plunger 53 can move relative to the electromagnet 51 in the axial direction when moving with the support member 87 in the axial direction.

(Operation of the Differential 1C)

By actuation and non-actuation of the actuator 5C, the differential 1C is switched between a coupled state where the first meshing section 41 and the second meshing section 223 mesh with each other in the peripheral direction and the intermittent member 4 and the differential case 2 are coupled in the manner to inhibit the relative rotation and an uncoupled state where the intermittent member 4 and the differential case 2 can make the relative rotation.

During the non-actuation of the actuator 5C when the excitation current is not supplied to the coil 511 of the electromagnet 51, the intermittent member 4 moves to the disc section 211 side of the first case member 21 by the resilience of the wave washer 71, and meshing between the first meshing section 41 and the second meshing section 223 is canceled. Because the differential case 2 and the intermittent member 4 can make the relative rotation during this non-actuation of the actuator 5C, the transmission of the drive power from the differential case 2 to the pinion shaft 30 of the differential mechanism 3 is cut off. In this way, the drive power that is received by the differential case 2 from the ring gear 23 is not transmitted to the driveshaft, and the vehicle is brought into the two-wheel-drive state.

Figure 14A:
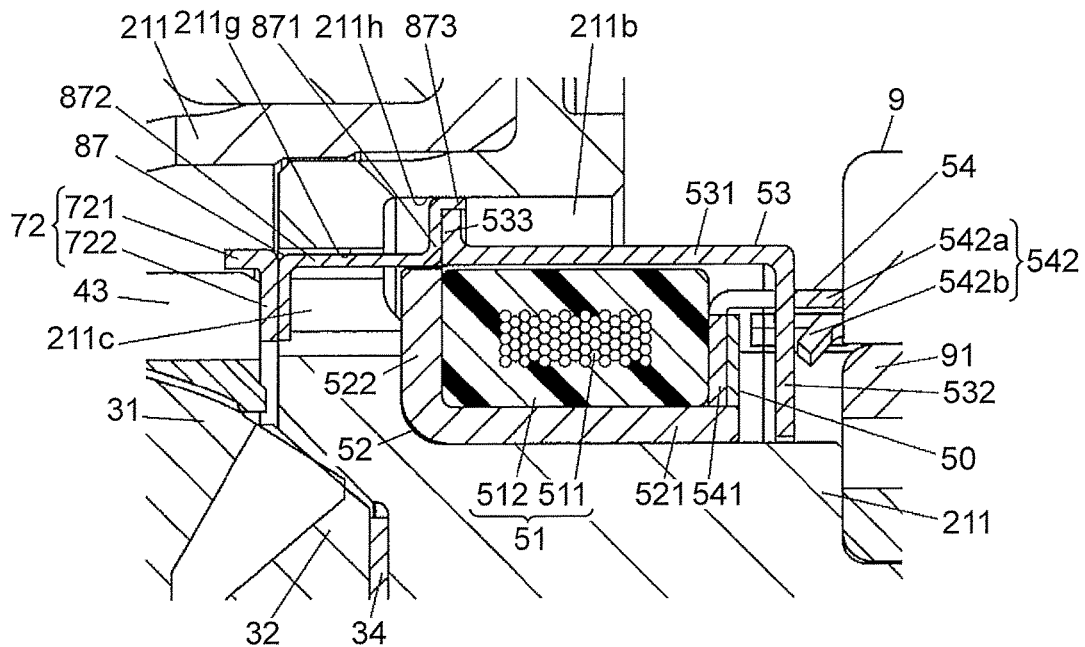
FIG. 14A is a partially enlarged view of FIG. 13, showing a non-actuated state of an actuator.
Figure 14B:
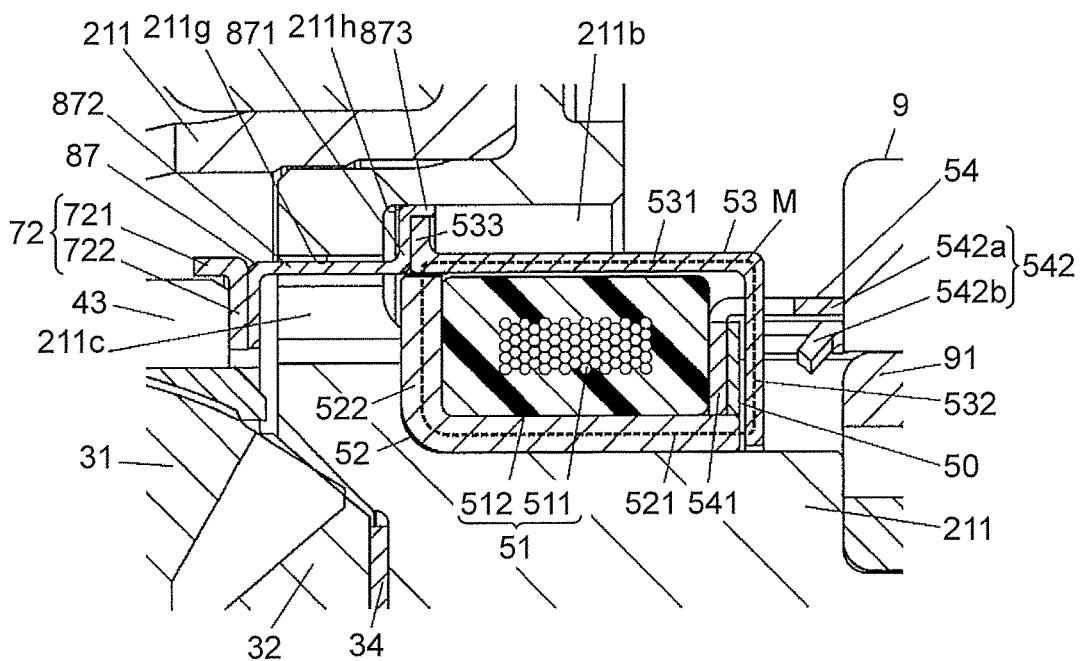
FIG. 14B is a partially enlarged view of FIG. 13, showing an actuated state of the actuator.

On the other hand, when the excitation current is supplied to the coil 511 of the electromagnet 51, the magnetic flux is generated in the magnetic path M, which is indicated by the broken line in FIG. 14B. Then, the plunger 53 moves in the axial direction by the magnetic force of the electromagnet 51. In this way, the intermittent member 4 is pressed to the bottom section 222 side of the second case member 22, and the first meshing section 41 and the second meshing section 223 mesh with each other. Just as described, the intermittent member 4 can move in the axial direction between the coupled position where the meshing teeth 411 mesh with the second meshing section 223 of the differential case 2 and the uncoupled position where the meshing teeth 411 do not mesh with the second meshing section 223 of the differential case 2.

When the first meshing section 41 and the second meshing section 223 mesh with each other, the drive power that is received by the second case member 22 of the differential case 2 from the ring gear 23 is transmitted to the driveshafts via the intermittent member 4, the pinion shafts 30 of the differential mechanism 3, the four pinion gears 31, and the side gears 32, and the vehicle is brought into the four-wheel-drive state.

(Action and Effects of the Fourth Embodiment)

According to the fourth embodiment that has been described so far, the electromagnet 51 is surrounded by the yoke 52C and the plunger 53, each of which has the L-shaped cross section, and the magnetic path M of the magnetic flux is defined by these yoke 52C and plunger 53. Thus, the members that constitute the magnetic path M can be configured simply, and manufacturing cost can thereby be kept down. When such a configuration is adopted, the outer ring section 531 of the plunger 53 directly faces the resin member 512 of the electromagnet 51 without another member being interposed therebetween. Thus, when the outer ring section 531 slides on the surface of the resin member 512 by the axial movement of the plunger 53, the resin member 512 is worn. This wear becomes significant at a high temperature at which the resin member 512 is expanded. However, in this embodiment, the support member 87 supports the plunger 53 in a manner to maintain the radial gap between the outer ring section 531 of the plunger 53 and the electromagnet 51. Thus, the wear of the resin member 512 is prevented.

In addition, according to this embodiment, because the non-magnetic support member 87 is interposed between the plunger 53 and the intermittent member 4, the leakage of the magnetic flux that is introduced to the plunger 53 to the intermittent member 4 side can be prevented.

Fifth Embodiment

Next, a description will be made on a fifth embodiment of the disclosure with reference to FIG. 18 to FIG. 22B.

A differential 1D includes: the differential case 2A that is rotatably supported by the differential carrier 9A via the bearings 93, 94; the differential mechanism 3A accommodated in the differential case 2A; the intermittent member 4A that can intermittently transmit the drive power between the differential case 2A and the first side gear 37 of the differential mechanism 3A; an actuator 5D that makes the intermittent member 4A move; the wave washer 73 as the urging member that urges the intermittent member 4A to the actuator 5D side; and the position sensor 100 that outputs the electrical signal indicative of an operation state of the actuator 5D. Of these, the intermittent member 4A and the actuator 5D constitute an interrupter 10D that interrupts coupling of the differential case 2A as the first rotary member and the first side gear 37 of the differential mechanism 3A as the second rotary member.

The differential mechanism 3A has: the plural (five in this embodiment) pinion gear pairs 3B, in each of which the first pinion gear 35 and the second pinion gear 36 mesh with each other; and the first side gear 37 and the second side gear 38 as the paired output members. During non-actuation of the actuator 5D, the first and second side gears 37, 38 can rotate relative to the differential case 2A about the common rotational axis O. The differential mechanism 3A outputs the drive power, which is received from the differential case 2A, from the first and second side gears 37, 38 while permitting the differential motion thereof.

Each of the first side gear 37 and the second side gear 38 has the cylindrical shape. The inner peripheral surface of the first side gear 37 is formed with the spline-fitted section 370, to which one of the right and left driveshafts is coupled in the manner to inhibit the relative rotation thereto. The inner peripheral surface of the second side gear 38 is formed with the spline-fitted section 380, to which the other driveshaft is coupled in the manner to inhibit the relative rotation thereto.

The differential case 2A is formed with plural holding holes 200, each of which rotatably holds the first pinion gear 35 and the second pinion gear 36 of the pinion gear pair 3B. The first pinion gear 35 and the second pinion gear 36 revolve about the rotational axis O and can rotate in the holding hole 200 with the center axes thereof being the rotational axes.

Figure 18:
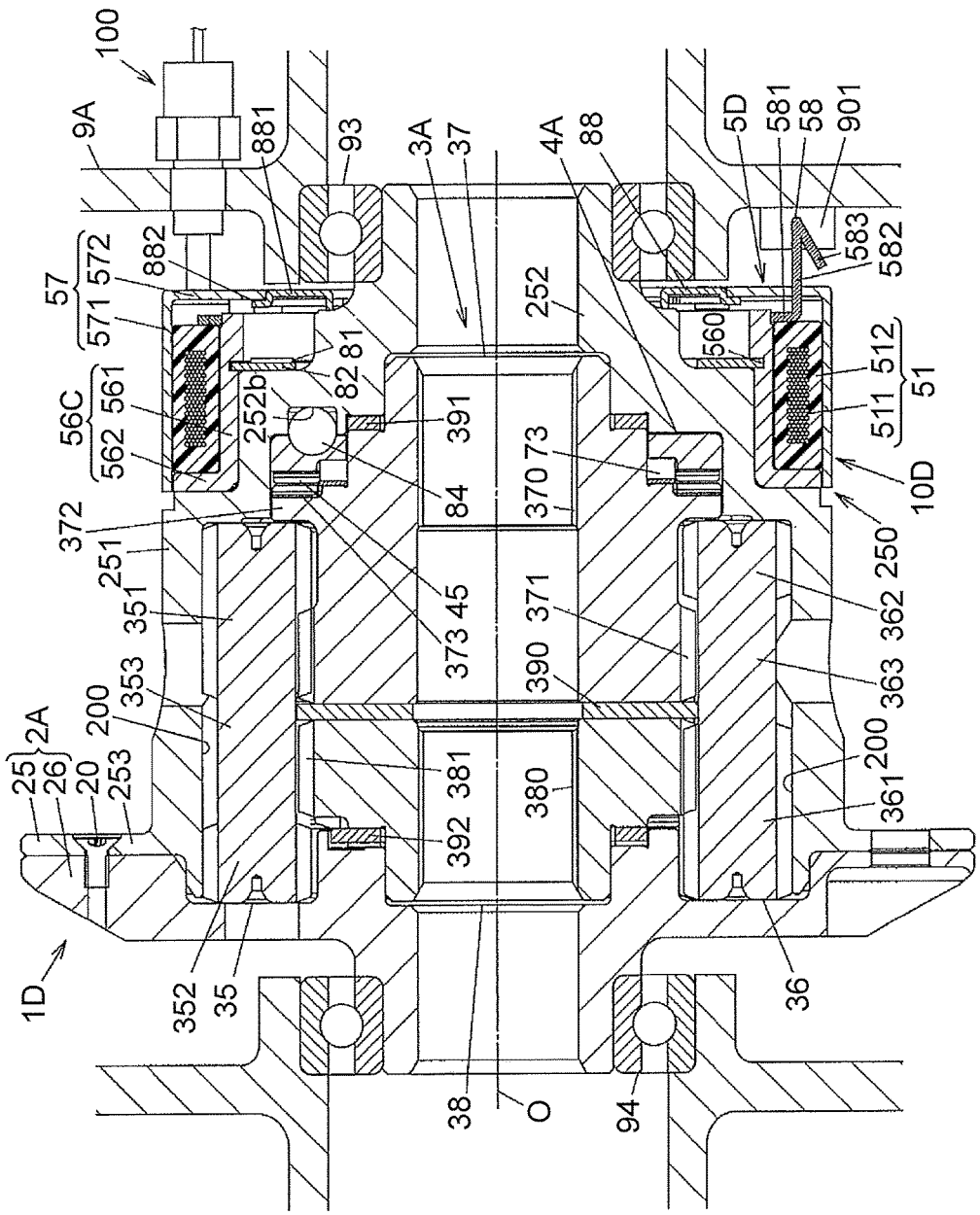
FIG. 18 is a cross-sectional view of a configuration example of a differential according to a fifth embodiment of the disclosure.

The first side gear 37 and the second side gear 38 have the common outer diameter, and the outer peripheral surfaces thereof are respectively formed with the gear sections 371, 381, each of which includes the plural helical teeth. As shown in FIG. 18, in the first side gear 37, the plural meshing teeth 373 that mesh with the meshing section 45 (will be described below) of the intermittent member 4A are formed in the annular wall section 372 that is projected to the outer peripheral side from the gear section 371. The center washer 390 is disposed between the first side gear 37 and the second side gear 38. The first side washer 391 is disposed on the side of the first side gear 37, and the second side washer 392 is disposed on the side of the second side gear 38.

The first pinion gear 35 integrally has the long gear section 351, the short gear section 352, and the coupling section 353 that couples the long gear section 351 and the short gear section 352 in the axial direction. Similarly, the second pinion gear 36 integrally has the long gear section 361, the short gear section 362, and the coupling section 363 that couples the long gear section 361 and the short gear section 362 in the axial direction.

The long gear section 351 of the first pinion gear 35 meshes with the gear section 371 of the first side gear 37 and the short gear section 362 of the second pinion gear 36, and the short gear section 352 thereof meshes with the long gear section 361 of the second pinion gear 36. The long gear section 361 of the second pinion gear 36 meshes with the gear section 381 of the second side gear 38 and the short gear section 352 of the first pinion gear 35, and the short gear section 362 thereof meshes with the long gear section 351 of the first pinion gear 35. Note that the helical teeth of each of these gear sections are not shown in FIG. 21.

When the first side gear 37 and the second side gear 38 rotate at the same speed, the first pinion gear 35 and the second pinion gear 36 do not rotate in the holding hole 200 but revolve with the differential case 2A. In addition, when the rotational speeds of the first side gear 37 and the second side gear 38 differ during turning of the vehicle or the like, for example, the first pinion gear 35 and the second pinion gear 36 revolve while rotating in the holding hole 200. In this way, the drive power that is received by the differential case 2A is distributed to the first side gear 37 and the second side gear 38 while the differential motion thereof is permitted.

Figure 19A:
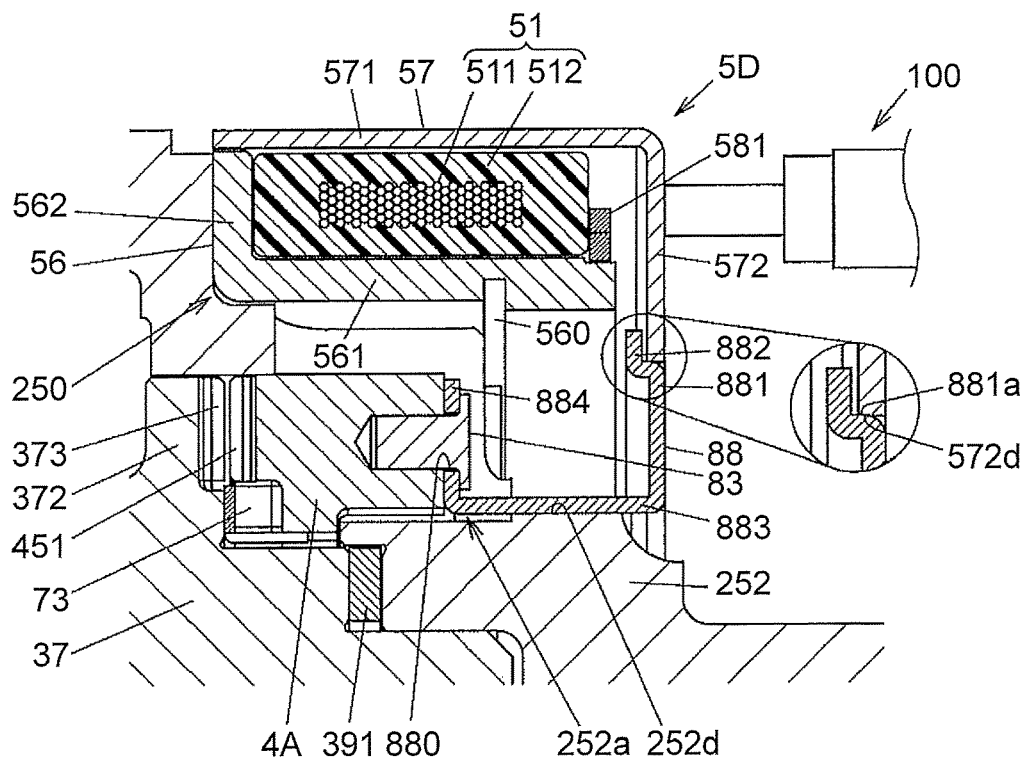
FIG. 19A is a partially enlarged view of FIG. 18, showing a non-actuated state of an actuator.
Figure 19B:
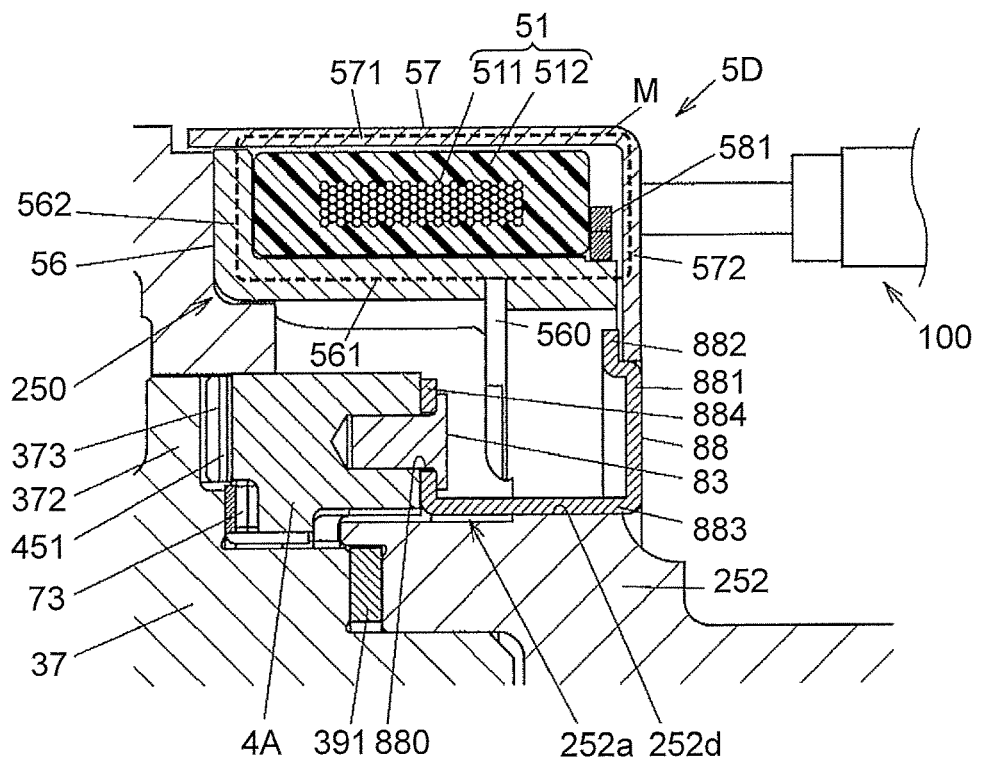
FIG. 19B is a partially enlarged view of FIG. 18, showing an actuated state of the actuator.
Figure 20:
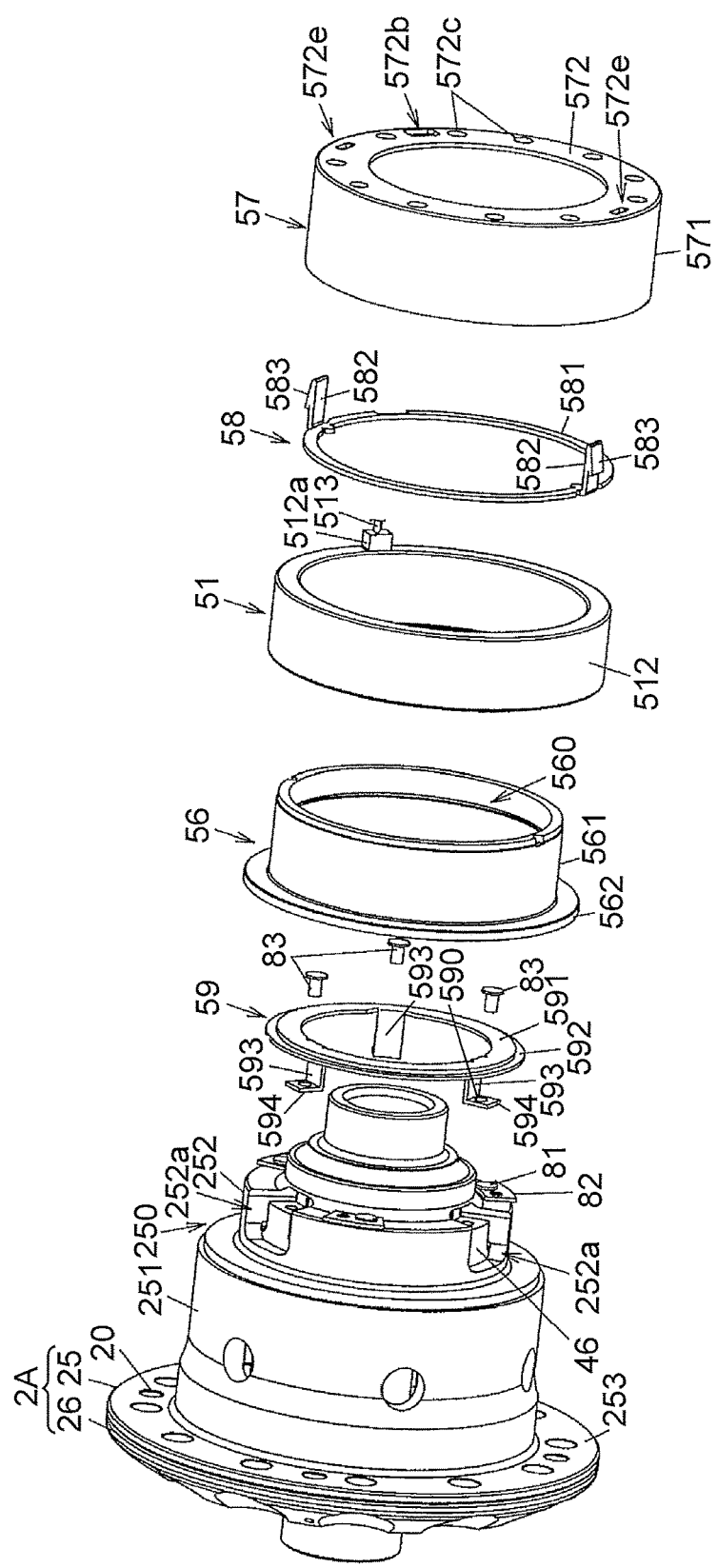
FIG. 20 is an exploded perspective view of the differential according to the fifth embodiment.
Figure 21:
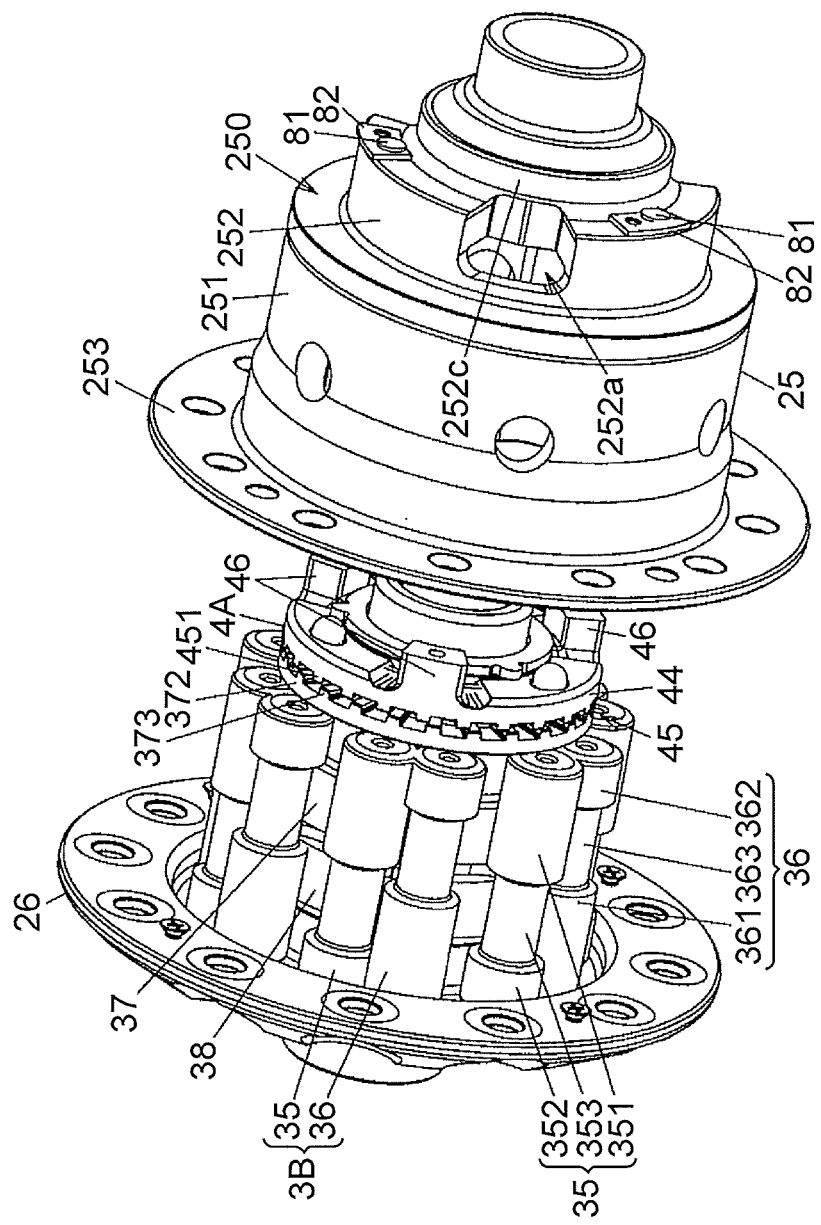
FIG. 21 is an exploded perspective view of a differential case and an internal structure thereof in the differential according to the fifth embodiment.

The intermittent member 4A can move in the axial direction between the coupled position where the differential case 2A and the first side gear 37 are coupled in the manner to inhibit the relative rotation and the uncoupled position where the relative rotation of the differential case 2A and the first side gear 37 is permitted. FIG. 19A shows the state where the intermittent member 4A is at the uncoupled position, and FIG. 19B shows the state where the intermittent member 4A is at the coupled position.

When the intermittent member 4A is at the coupled position, the differential motion of the differential case 2A and the first side gear 37 is restricted. Accordingly, the first pinion gear 35 and the second pinion gear 36 cannot rotate, and the differential motion of the differential case 2A and the second side gear 38 is also restricted. The intermittent member 4A is urged toward the uncoupled position by the wave washer 73 that is disposed between the intermittent member 4A and the first side gear 37.

The actuator 5D has: the annular electromagnet 51 in which the resin member 512 covers the coil 511; a yoke 56C that holds the electromagnet 51; the plunger 57 that moves with the intermittent member 4A in the axial direction; the detent member 58 that restricts axial movement and rotation of the yoke 56C relative to the differential carrier 9A; and a support member 88 that supports the plunger 57 and transmits the moving force of the plunger 57 to the intermittent member 4A.

By using the magnetic force that is generated by the energization of the coil 511, the plunger 57 makes the intermittent member 4A move in such a direction that the meshing section 45 meshes with the meshing teeth 373 of the first side gear 37. The meshing section 45 of the intermittent member 4A meshes with the meshing teeth 373 of the meshing section 45 by the moving force of the actuator 5D that is transmitted via the support member 88.

The yoke 56C is an annular member with an L-shaped cross section and is formed of the soft magnetic metal such as the low-carbon steel. The yoke 56C integrally has: the cylindrical section 561 that covers the inner peripheral surface of the resin member 512 of the electromagnet 51 from inside; and the wall section 562 in a shape of the ring-shaped plate that extends outward from the one axial end of the cylindrical section 561 and covers the part of the one axial end surface of the resin member 512. The cylindrical section 561 of the yoke 56C is formed such that the inner diameter thereof is slightly larger than the outer diameter of the portion of the differential case 2A that opposes the inner peripheral surface of this cylindrical section 521.

The detent member 58 is fixed to an end of the cylindrical section 561 of the yoke 56C on the opposite side from the wall section 562. The detent member 58 integrally has: the annular section 581 that is disposed on the outer periphery of the cylindrical section 561 of the yoke 56C; the projected sections 582 that are projected in the axial direction from the two positions in the annular section 581 in the peripheral direction; and the folded section 583 that is formed by folding the tip of each of the projected sections 582 at the acute angle. The annular section 581 is fixed to the outer peripheral surface of the cylindrical section 561 of the yoke 56C by welding, for example.

The inner peripheral surface of the cylindrical section 561 of the yoke 56C is formed with the annular recessed section 560, to which the plural (three in this embodiment) plates 82 are fitted, each of the plates 82 is formed of the non-magnetic body that is fixed to the differential case 2A by the press-fit pin 81. Because the plates 82 are fitted to the annular recessed section 560, the axial movement of the yoke 56C relative to the differential case 2A is restricted. The annular recessed section 560 is formed such that the width thereof in the axial direction is greater than the thickness of the plate 82, so as to prevent the generation of the rotational resistance between the yoke 56C and the differential case 2A during the rotation of the differential case 2A.

The projected sections 582 of the detent member 58 are respectively locked by the locking sections 901 that are provided in the differential carrier 9A, and the rotation of the detent member 58 is thereby stopped. The differential carrier 9A is provided with the two locking sections 901 that respectively lock the projected sections 582, and one of the locking sections 901 is shown in FIG. 18. The plunger 57 is retained by the detent member 58 through the folded section 583, and the rotation thereof relative to the differential carrier 9A is stopped by the projected sections 582.

The plunger 57 is an annular member with an L-shaped cross section and is formed of the soft magnetic metal such as the low-carbon steel. The plunger 57 integrally has: the outer ring section 571 that is disposed on the outer periphery of the electromagnet 51; and the lateral plate section 572 that opposes the electromagnet 51 in the axial direction. The outer ring section 571 has the cylindrical shape that covers the electromagnet 51 from the outer peripheral side. The lateral plate section 572 is projected inward from the one axial end of the outer ring section 571. An inner diameter of the outer ring section 571 is larger than the outer diameter of the electromagnet 51 (the outer diameter of the resin member 512), and the inner peripheral surface of the outer ring section 571 opposes the outer peripheral surface of the electromagnet 51 (the outer peripheral surface of the resin member 512) via a gap.

The lateral plate section 572 is formed with: two insertion holes 572e, through which the projected sections 582 of the detent member 58 are respectively inserted; the through hole 572b that is penetrated by the boss section 512a of the electromagnet 51; and the plural (ten in the example shown in FIG. 20) oil holes 572c, through which the lubricant flows. One end of the support member 88 abuts the lateral plate section 572.

The support member 88 is formed of a non-magnetic body such as the austenitic stainless steel and integrally has: a ring section 881 that is disposed in the lateral plate section 572 of the plunger 57; an abutment section 882 that is provided on an outer peripheral side of the ring section 881 and abuts the end on the inner diameter side of the lateral plate section 572 of the plunger 57; three projected shafts 883, each of which extends from the ring section 881 in the axial direction; and fixed sections 884 that are projected inward from tips of the projected shafts 883 and are fixed to the intermittent member 4A. The abutment section 882 slides on the lateral plate section 572 of the plunger 57, and the support member 88 thereby rotates with the differential case 2A. The fixed sections 884 are each formed with an insertion hole 880, through which the press-fit pin 83 is inserted to fix the fixed section 884 to the intermittent member 4A.

The differential case 2A has the first case member 25 and the second case member 26 that are fixed to each other by the plural screws 20. The first case member 25 is supported by the bearing 93 to be rotatable relative to the differential carrier 9A, and the second case member 26 is supported by the bearing 94 to be rotatable relative to the differential carrier 9A.

The first case member 25 integrally has: the cylindrical section 251 that holds the plural pinion gear pairs 3B in the manner to allow the rotation thereof; the bottom section 252 that extends inward from the one axial end of the cylindrical section 251; and the flange section 253 that abuts the second case member 26. The corner section between the cylindrical section 251 and the bottom section 252 is formed with the annular recessed section 250 in which the electromagnet 51 and the yoke 56C are disposed. The first side gear 37 and the second side gear 38 are disposed in the cylindrical section 251.

The bottom section 252 of the first case member 25 is formed with the plural insertion holes 252a, in each of which the projected shaft 883 and the fixed section 884 of the support member 88 are inserted. The insertion holes 252a penetrate the bottom section 252 in the axial direction. The protruding sections 46 (will be described below) of the intermittent member 4A are respectively inserted in the insertion holes 252a. The protruding sections 46 are respectively inserted in the insertion holes 252a, and the relative rotation of the intermittent member 4A to the differential case 2A is thereby restricted. In this embodiment, the three insertion holes 252a are formed at the equally spaced intervals along the peripheral direction of the bottom section 252.

When the excitation current is supplied to the electromagnet 51, the magnetic flux is generated in the magnetic path M shown in FIG. 19B, and the plunger 57 moves in the axial direction. Due to this axial movement of the plunger 57, the intermittent member 4A is pressed via the support member 88 and moves from the uncoupled position to the coupled position.

As shown in FIG. 22A and FIG. 22B, the intermittent member 4A integrally has: the disc section 44 in the shape of the ring-shaped plate that is formed with the plural (three) bowl-shaped recessed section 440 on the one axial end surface 44a; the meshing section 45 that is formed on the other axial end surface 44b of the disc section 44 opposing the first side gear 37 in the axial direction; and the protruding sections 46 in trapezoidal column shapes, each of which is projected in the axial direction from the one axial end surface 44a of the disc section 44.

The one axial end surface 44a of the disc section 44 opposes the bottom section 252 of the first case member 25 in the axial direction. The protruding sections 46 are partially inserted in the insertion holes 252a that are formed in the bottom section 252 of the first case member 25, respectively. The protruding sections 46 are respectively inserted in the insertion holes 252a of the first case member 25, and the intermittent member 4A can thereby move relative to the differential case 2A in the axial direction but cannot make the relative rotation thereto. The width of the insertion hole 252a in the peripheral direction is greater than width of the protruding section 46 of the intermittent member 4A in the peripheral direction, and the differential case 2A and the intermittent member 4A can rotate relative to each other within a specified angular range that corresponds to a difference between the width of the insertion hole 252a in the peripheral direction and the width of the protruding section 46 of the intermittent member 4A in the peripheral direction.

The meshing section 45 of the intermittent member 4A is formed with the plural meshing teeth 451 that are projected in the axial direction. The plural meshing teeth 451 are formed in a part on the outer peripheral side of the other axial end surface 44b of the disc section 44. The other axial end surface 44b on the inside of the meshing section 45 is formed as the flat receiving surface, against which the wave washer 73 abuts, and which receives the urging force to the uncoupled position.

When the intermittent member 4A is pressed by the plunger 57 via the support member 88 and thereby moves to the coupled position, the plural meshing teeth 451 of the meshing section 45 respectively mesh with the plural meshing teeth 373 of the first side gear 37. That is, when the intermittent member 4A moves to the first side gear 37 side, the intermittent member 4A and the first side gear 37 are coupled in the manner to inhibit the relative rotation by meshing of the plural meshing teeth 451, 373. On the other hand, when the intermittent member 4A moves to the uncoupled position by the urging force of the wave washer 73, the meshing teeth 451, 373 no longer mesh with each other, and the intermittent member 4A and the first side gear 37 can thereby make the relative rotation.

The tip surface of each of the protruding sections 46 is formed with the press-fit hole 460, to which the press-fit pin 83 for fixing the intermittent member 4A to the support member 88 is press-fitted. When the press-fit pin 83, which is inserted through the insertion hole 880 formed in the fixed section 884 of the support member 88 is press-fitted to the press-fit hole 460, the intermittent member 4A is fixed to the support member 88 in the manner to integrally move therewith in the axial direction. Note that, instead of the press-fit pin 83, the fixed section 884 of the support member 88 and the protruding section 46 of the intermittent member 4A may be fastened by the bolt.

The depth of the bowl-shaped recessed section 440 in the axial direction is the greatest at the center in the peripheral direction, and the depth thereof in the axial direction is gradually reduced toward the end in the peripheral direction. The inner surface 440a of this bowl-shaped recessed section 440 is formed as the cam surface on which the cam thrust in the axial direction is generated by the relative rotation to the first case member 25. As shown in FIG. 18, the bottom section 252 of the first case member 25 is formed with the three recessed sections 252b (one of these recessed sections 252b is shown in FIG. 18), each of which is recessed in the axial direction, and the spherical body 84 that is disposed in each of these recessed sections 252b abuts the inner surface 440a of the bowl-shaped recessed section 440. The diameter of the recessed section 252b is substantially equal to the spherical diameter of the spherical body 84, and the spherical body 84 cannot roll in the recessed sections 252b.

The intermittent member 4A is formed with the inner surfaces 440a of the bowl-shaped recessed sections 440 over the angular range that is larger than the specified angular range where the differential case 2A and the intermittent member 4A can make the relative rotation. Then, when the intermittent member 4A rotates relative to the differential case 2A, the spherical body 84 abuts each of the inner surfaces 440a of the bowl-shaped recessed sections 440, and the cam thrust that presses the intermittent member 4A to the annular wall section 372 side of the first side gear 37 is thereby generated. In this way, the meshing section 45 of the intermittent member 4A and the meshing teeth 373 of the first side gear 37 reliably mesh with each other.

The projected shaft 883 abuts an outer peripheral surface 252d of the bottom section 252 on an outer side (the bearing 93 side) of the insertion hole 252a of the first case member 25, and a radial position of the support member 88 relative to the first case member 25 is thereby determined. When the support member 88 moves with the plunger 57 in the axial direction, the projected shaft 883 slides on the outer peripheral surface 252d of the bottom section 252. The abutment section 882 of the support member 88 is located on the insertion hole 252a side of the first case member 25 from the ring section 881, and a stepped surface 881a is formed between the ring section 881 and the abutment section 882. The stepped surface 881a corresponds to an outer peripheral surface of the ring section 881.

The support member 88 supports the plunger 57 in the manner to allow the axial movement thereof and prohibit the rotation relative to the electromagnet 51 so as to maintain the radial gap between the outer ring section 571 of the plunger 57 and the electromagnet 51. More specifically, an inner peripheral surface 572d of the lateral plate section 572 of the plunger 57 abuts the stepped surface 881a of the support member 88, and the plunger 57 is thereby supported by the support member 88 in the radial direction. In addition, during the rotation of the differential case 2A, the support member 88 can move with the plunger 57 in the axial direction while the stepped surface 881a thereof slides on the inner peripheral surface 572d of the lateral plate section 572 to make relative rotation thereto.

(Operation of the Differential 1D)

By the actuation and the non-actuation of the actuator 5D, the differential 1D is switched between the coupled state where the differential case 2A and the first side gear 37 are coupled by the intermittent member 4A in the manner to inhibit the relative rotation and the uncoupled state where the differential case 2A and the first side gear 37 can make the relative rotation.

During the non-actuation of the actuator 5D when the excitation current is not supplied to the coil 511 of the electromagnet 51, the intermittent member 4A separates from the annular wall section 372 of the first side gear 37 by the resilience of the wave washer 73, and meshing between the meshing section 45 and the second meshing teeth 373 is canceled. During this non-actuation of the actuator 5D, the drive power, which is received by the first pinion gear 35 and the second pinion gear 36 from the differential case 2A, is output from the first and second side gears 37, 38 while the differential motion thereof is permitted.

On the other hand, when the excitation current is supplied to the coil 511 of the electromagnet 51, the magnetic flux is generated in the magnetic path M, which is indicated by a broken line in FIG. 19B. Then, the plunger 57 moves in the axial direction by the magnetic force of the electromagnet 51. In this way, the intermittent member 4A is pressed to the bottom section 222 side of the second case member 22, and the meshing section 45 of the intermittent member 4A meshes with the meshing teeth 373 of the first side gear 37.

Just as described, the intermittent member 4A can move in the axial direction between the coupled position where the meshing teeth 451 mesh with the meshing teeth 373 of the first side gear 37 and the uncoupled position where the meshing teeth 451 do not mesh with the meshing teeth 373 of the first side gear 37.

When the meshing teeth 451 mesh with the meshing teeth 373 of the first side gear 37, the differential 1D is brought into the differential-lock state where the differential rotation between the first side gear 37 and the second side gear 38 is restricted.

Similar action and similar effects to those of the fourth embodiment can be obtained by the fifth embodiment that has been described so far.

Sixth Embodiment

Next, a description will be made on a sixth embodiment of the disclosure. In the fourth and fifth embodiments, the description has been made on the case where the inner peripheral surface of each of the outer ring sections 531, 571 of the plungers 53, 57 is disposed to oppose the outer peripheral surface of the resin member 512 of the electromagnet 51. Meanwhile, in this embodiment, a cylindrical section 621C of a plunger 62C is disposed to oppose the inner peripheral surface of the resin member 512 of the electromagnet 51.

Figure 23:
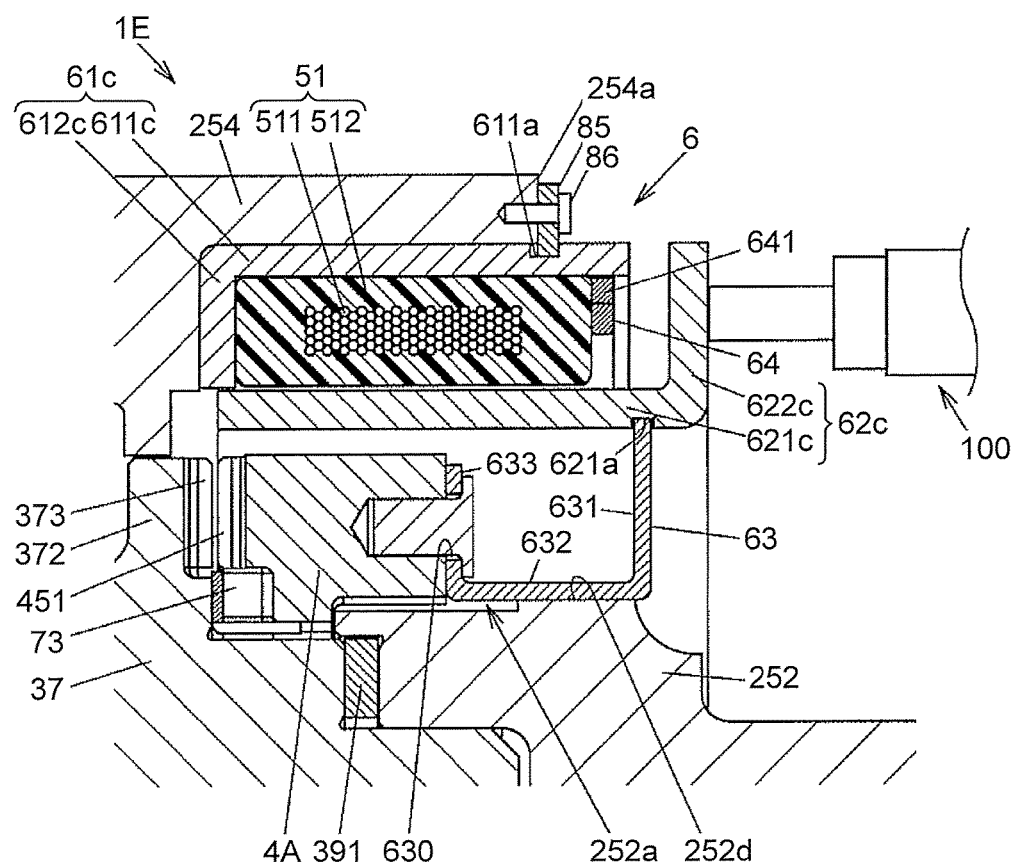
FIG. 23 is a partial cross-sectional view in which a portion of a differential according to a sixth embodiment is enlarged.

FIG. 23 is a partial cross-sectional view in which a portion of a differential 1E according to the sixth embodiment is enlarged. In FIG. 23, components that are in common with the second embodiment are denoted by the same reference numerals and descriptions thereon will not be made. This differential 1E is configured in the similar manner to the differential of the fifth embodiment except for a portion shown in FIG. 23.

The differential 1E includes an actuator 6 that makes the intermittent member 4A move in the axial direction. The actuator 6 includes: the electromagnet 51; a yoke 61C that holds the electromagnet 51; the plunger 62C that moves with the intermittent member 4A in the axial direction; a support member 63 that supports the plunger 62C and transmits a moving force of the plunger 62C to the intermittent member 4A; and a detent member 64 that restricts the axial movement of the electromagnet 51 relative to the yoke 61C and rotation of the yoke 61C. Similar to the detent member 58 according to the second embodiment, the detent member 64 includes: an annular section 641 that is fixed to the yoke 61C; and an unillustrated projected section that penetrates the plunger 62C in the axial direction and is projected from the annular section 641 in the axial direction.

Each of the yoke 61C and the plunger 62C is the annular member with the L-shaped cross section and is formed of the soft magnetic metal such as the low-carbon steel. The yoke 61C integrally includes: a cylindrical section 611C that covers the outer peripheral surface of the resin member 512 of the electromagnet 51 from outside; and the wall section 612C in the shape of the ring-shaped plate that is projected inward from one axial end of the cylindrical section 611C and covers the part of the one axial end surface of the resin member 512. The cylindrical section 611C of the yoke 61C is disposed inside a cylindrical outer coat section 254, which is provided in the first case member 25, in a manner capable of rotating relative thereto. Axial movement of the yoke 61C relative to the first case member 25 is restricted when a plate 85, which is fixed to an axial end surface 254a of the outer coat section 254 by a pin 86, is engaged with an annular groove 611a provided on an outer peripheral surface of the cylindrical section 611C.

The plunger 62C integrally includes: the cylindrical section 621C that is disposed on the inner periphery of the electromagnet 51; and a lateral plate section 622C that opposes the electromagnet 51 in the axial direction. The cylindrical section 621C has a cylindrical shape that covers the electromagnet 51 from the inner peripheral side, and an inner peripheral surface thereof is formed with an annular groove 621a that is recessed in a radial direction. The lateral plate section 622C is projected outward from one axial end of the cylindrical section 621C. An outer diameter of the cylindrical section 621C is smaller than an inner diameter of the electromagnet 51 (an inner diameter of the resin member 512), and an outer peripheral surface of the cylindrical section 621C opposes an inner peripheral surface of the electromagnet 51 (the inner peripheral surface of the resin member 512) via a gap.

The support member 63 is formed of non-magnetic metal such as the austenitic stainless steel and integrally includes: a ring section 631 that is disposed inside the plunger 62C; plural projected shafts 632, each of which extends from an inner radial end of the ring section 631; and fixed sections 633 that are projected outward from tips of the projected shafts 632 and are fixed to the intermittent member 4A. The fixed sections 633 are each formed with an insertion hole 630, through which the press-fit pin 83 is inserted to fix the fixed section 633 to the intermittent member 4A. When the projected shafts 632 abut the outer peripheral surface 252d of the first case member 25, a radial position of the support member 63 relative to the first case member 25 is determined.

An end on an outer radial side of the ring section 631 is engaged with the annular groove 621a of the plunger 62C, and the support member 63 is thereby restricted from making relative movement to the plunger 62C in the axial direction and moves with the plunger 62C in the axial direction. In addition, when the end on the outer radial side of the ring section 631 is engaged with the annular groove 621a of the plunger 62C, the support member 63 restricts radial movement of the plunger 62C relative to the first case member 25 and the yoke 61C. In this way, a gap between the cylindrical section 621C of the plunger 62C and the electromagnet 51 is maintained. That is, the support member 63 supports the plunger 62C in the manner to allow the axial movement thereof and prohibit the rotation relative to the electromagnet 51 so as to maintain the gap between the cylindrical section 621C of the plunger 62C and the electromagnet 51.

Similar action and similar effects to those of the fourth embodiment can also be obtained by the sixth embodiment that has been described so far.

What is claimed is:

1. An interrupter that interrupts coupling of a first rotary member and a second rotary member disposed in a manner capable of making relative rotation to each other about a common rotational axis, the interrupter comprising:
   an intermittent member, relative rotation thereof to the first rotary member being restricted, which has a meshing tooth meshing with the second rotary member, and which is configured to move in an axial direction between a coupled position where the meshing tooth meshes with the second rotary member and an uncoupled position where the meshing tooth does not mesh with the second rotary member; and
   an actuator that is configured to make the intermittent member move in the axial direction, wherein
   the actuator includes:
      a coil that generates magnetic flux when being energized; and
      a plunger formed of a magnetic body that moves with the intermittent member in the axial direction,
   the plunger is disposed in a manner capable of moving relative to one rotary member of the first and second rotary members in the axial direction via first and second air gaps with respect to first and second faces of the one rotary member, and
   when the coil is energized, the magnetic flux communicates to the plunger at the first face of the one rotary member via one air gap of the first and second air gaps, the magnetic flux communicates to the plunger at the second face of the one rotary member via the other air gap, and the plunger moves in the axial direction so as to reduce a size of at least one air gap of the first and second air gaps in a direction perpendicular to the respective first or second face, wherein
   the first air gap is provided between one axial end surface of the one rotary member and an opposing surface of the plunger that opposes the axial end surface in the axial direction, and
   the second air gap is provided between a radially outer peripheral surface of the one rotary member and a radially innermost peripheral surface of the plunger with a specified distance in a radial direction.

2. The interrupter according to claim 1, wherein
   an intervening member that is formed of a non-magnetic body is disposed between the plunger and the intermittent member; and
   the plunger presses the intermittent member via the intervening member.

3. The interrupter according to claim 2, wherein
   the intervening member includes plural projected shafts, each of which is inserted through an axial through hole formed in the one rotary member, and radial movement thereof relative to the one rotary member is restricted, and
   the plunger is disposed outside the one rotary member, and radial movement thereof relative to the one rotary member is restricted by the intervening member.

4. The interrupter according to claim 1, wherein
   the coil is held in a coil housing, which is formed of a magnetic body, via a resin member,
   the coil housing includes: a cylindrical section that is disposed between the one rotary member and the resin member with the rotational axis being a center axis; and a wall section in a shape of a ring-shaped plate that extends from one end of the cylindrical section in the radial direction, and
   the wall section of the coil housing and the plunger are spaced apart from each other with a clearance larger than each of the first and second air gaps.

5. The interrupter according to claim 4, wherein
   an intervening member that is formed of a non-magnetic body is disposed between the plunger and the intermittent member; and
   the plunger presses the intermittent member via the intervening member.

6. The interrupter according to claim 5, wherein
   the intervening member includes plural projected shafts, each of which is inserted through an axial through hole formed in the one rotary member, and radial movement thereof relative to the one rotary member is restricted, and the plunger is disposed outside the one rotary member, and radial movement thereof relative to the one rotary member is restricted by the intervening member.

7. The interrupter according to claim 4, wherein the plunger is supported by the resin member in the radial direction, and the second air gap is thereby maintained.

8. The interrupter according to claim 7, wherein an intervening member that is formed of a non-magnetic body is disposed between the plunger and the intermittent member; and the plunger presses the intermittent member via the intervening member.

9. The interrupter according to claim 8, wherein the intervening member includes plural projected shafts, each of which is inserted through an axial through hole formed in the one rotary member, and radial movement thereof relative to the one rotary member is restricted, and the plunger is disposed outside the one rotary member, and radial movement thereof relative to the one rotary member is restricted by the intervening member.

10. The interrupter according to claim 1, wherein the coil, plunger and the one rotary member are arranged such that the magnetic flux is generated in a magnetic path consisting of only the plunger, the one rotary member, the first air gap and the second air gap.

11. A differential comprising:
a first rotary member and a second rotary member disposed in a manner capable of making relative rotation to each other about a common rotational axis;
an intermittent member, relative rotation thereof to the first rotary member is restricted, which has a meshing tooth meshing with the second rotary member, and which is configured to move in an axial direction between a coupled position where the meshing tooth meshes with the second rotary member and an uncoupled position where the meshing tooth does not mesh with the second rotary member;
an actuator that is configured to make the intermittent member move in the axial direction; and
a differential mechanism that is configured to receive drive power from paired output members while permitting differential motion thereof, wherein
the actuator includes:
a coil that generates magnetic flux when being energized; and
a plunger that moves with the intermittent member in the axial direction,
the plunger is disposed in a manner capable of moving relative to one rotary member of the first and second rotary members in the axial direction via first and second air gaps with respect to first and second faces of the one rotary member, and
when the coil is energized, the magnetic flux communicates to the plunger at the first face of the one rotary member via one air gap of the first and second air gaps, the magnetic flux communicates to the plunger at the second face of the one rotary member via the other air gap, and the plunger moves in the axial direction so as to reduce a size of at least one air gap of the first and second air gaps in a direction perpendicular to the respective first or second face, wherein the first air gap is provided between one axial end surface of the one rotary member and an opposing surface of the plunger that opposes the axial end surface in the axial direction, and the second air gap is provided between a radially outer peripheral surface of the one rotary member and a radially innermost peripheral surface of the plunger with a specified distance in a radial direction.

12. The differential according to claim 11, wherein an intervening member that is formed of a non-magnetic body is disposed between the plunger and the intermittent member; and the plunger presses the intermittent member via the intervening member.

13. The differential according to claim 12, wherein the intervening member includes plural projected shafts, each of which is inserted through an axial through hole formed in the one rotary member, and radial movement thereof relative to the one rotary member is restricted, and the plunger is disposed outside the one rotary member, and radial movement thereof relative to the one rotary member is restricted by the intervening member.

14. The differential according to claim 11, wherein the coil, plunger and the one rotary member are arranged such that the magnetic flux is generated in a magnetic path consisting of only the plunger, the one rotary member, the first air gap and the second air gap.

15. An interrupter that interrupts coupling of a first rotary member and a second rotary member disposed in a manner capable of making relative rotation to each other about a common rotational axis, the interrupter comprising:
an intermittent member, relative rotation thereof to the first rotary member being restricted, which has a meshing tooth meshing with the second rotary member, and which is configured to move in an axial direction between a coupled position where the meshing tooth meshes with the second rotary member and an uncoupled position where the meshing tooth does not mesh with the second rotary member; and
an actuator that is configured to make the intermittent member move in the axial direction, wherein
the actuator includes:
a coil that generates magnetic flux when being energized; and
a plunger formed of a magnetic body that moves with the intermittent member in the axial direction,
the plunger is disposed in a manner capable of moving relative to one rotary member of the first and second rotary members in the axial direction via first and second air gaps with respect to first and second faces of the one rotary member, and
when the coil is energized, the magnetic flux communicates to the plunger at the first face of the one rotary member via one air gap of the first and second air gaps, the magnetic flux communicates to the plunger at the second face of the one rotary member via the other air gap, and the plunger moves in the axial direction so as to reduce a size of at least one air gap of the first and second air gaps in a direction perpendicular to the respective first or second face, wherein the first air gap is provided between one axial end surface of the one rotary member and an opposing surface of the plunger that opposes the axial end surface in the axial direction, and the second air gap is provided between a radially outer peripheral surface of the one rotary member and a radially outermost peripheral surface of the plunger with a specified distance in a radial direction.

16. The interrupter according to claim 15, wherein
an intervening member that is formed of a non-magnetic body is disposed between the plunger and the intermittent member; and
the plunger presses the intermittent member via the intervening member.

17. A differential comprising:
a first rotary member and a second rotary member disposed in a manner capable of making relative rotation to each other about a common rotational axis;
an intermittent member, relative rotation thereof to the first rotary member is restricted, which has a meshing tooth meshing with the second rotary member, and which is configured to move in an axial direction between a coupled position where the meshing tooth meshes with the second rotary member and an uncoupled position where the meshing tooth does not mesh with the second rotary member;
an actuator that is configured to make the intermittent member move in the axial direction; and
a differential mechanism that is configured to receive drive power from paired output members while permitting differential motion thereof, wherein
the actuator includes:
 a coil that generates magnetic flux when being energized; and
 a plunger that moves with the intermittent member in the axial direction,
the plunger is disposed in a manner capable of moving relative to one rotary member of the first and second rotary members in the axial direction via first and second air gaps with respect to first and second faces of the one rotary member, and
when the coil is energized, the magnetic flux communicates to the plunger at the first face of the one rotary member via one air gap of the first and second air gaps, the magnetic flux communicates to the plunger at the second face of the one rotary member via the other air gap, and the plunger moves in the axial direction so as to reduce a size of at least one air gap of the first and second air gaps in a direction perpendicular to the respective first or second face, wherein
the first air gap is provided between one axial end surface of the one rotary member and an opposing surface of the plunger that opposes the axial end surface in the axial direction, and
the second air gap is provided between a radially outer peripheral surface of the one rotary member and a radially outermost peripheral surface of the plunger with a specified distance in a radial direction.

18. The differential according to claim 17, wherein
an intervening member that is formed of a non-magnetic body is disposed between the plunger and the intermittent member; and
the plunger presses the intermittent member via the intervening member.

* * * * *